(12) United States Patent
Kocsis et al.

(10) Patent No.: US 12,273,458 B2
(45) Date of Patent: Apr. 8, 2025

(54) BLOCKCHAIN-POWERED CLOUD MANAGEMENT SYSTEM

(71) Applicants: Jin Kocsis, Lafayette, IN (US); Mututhanthrige Pravenn Sameera Fernando, Akron, OH (US)

(72) Inventors: Jin Kocsis, Lafayette, IN (US); Mututhanthrige Pravenn Sameera Fernando, Akron, OH (US)

(73) Assignee: The University of Akron, Akron, OH (US)

( * ) Notice: Subject to any disclaimer, the term of this patent is extended or adjusted under 35 U.S.C. 154(b) by 546 days.

(21) Appl. No.: 16/823,629

(22) Filed: Mar. 19, 2020

(65) Prior Publication Data

US 2020/0374127 A1 Nov. 26, 2020

Related U.S. Application Data

(60) Provisional application No. 62/850,636, filed on May 21, 2019.

(51) Int. Cl.
*H04L 9/32* (2006.01)
*G06F 9/455* (2018.01)
(Continued)

(52) U.S. Cl.
CPC ........ *H04L 9/3239* (2013.01); *G06F 9/45558* (2013.01); *H04L 9/3297* (2013.01); *H04L 12/4633* (2013.01); *H04L 41/5022* (2013.01); *H04L 45/38* (2013.01); *H04L 61/5007* (2022.05); *H04L 67/1042* (2013.01);
(Continued)

(58) Field of Classification Search
CPC ............... H04L 9/3239; H04L 61/5007; H04L 9/3297; H04L 12/4633; H04L 41/5022; H04L 45/38; H04L 67/1042; G06F 9/45558
See application file for complete search history.

(56) References Cited

U.S. PATENT DOCUMENTS

| 11,558,265 B1 * | 1/2023 | Poornachandran ..... H04L 43/55 |
| 11,570,264 B1 * | 1/2023 | Poornachandran ... H04L 67/104 |

(Continued)

OTHER PUBLICATIONS

Tselios et al. (Enhancing SDN Security for IoT-related deployments through Blockchain, IEEE NFV-SDN 2017, pp. 303-308) (Year: 2017).*

(Continued)

*Primary Examiner* — Oleg Korsak
(74) *Attorney, Agent, or Firm* — Renner, Kenner, Greive, Bobak, Taylor & Weber Co., LPA

(57) ABSTRACT

In various embodiments, the present invention relates to a blockchain-powered SDN-enabled networking infrastructure in which the integration between blockchain-based security and autonomy management layer and multi-controller SDN networking layer is defined to enhance the integrity of the control and management messages. In one or more embodiments, this networking infrastructure is utilized achieve three main functionalities: (1) integrity verification of control and management commands for cloud platforms, (2) identification of the malicious hosts abusing the cloud platform, and (3) enhancing the availability of the cloud platform via autonomous bandwidth provisioning.

19 Claims, 13 Drawing Sheets

(51) Int. Cl.
*H04L 12/46* (2006.01)
*H04L 41/5022* (2022.01)
*H04L 45/00* (2022.01)
*H04L 61/5007* (2022.01)
*H04L 67/1042* (2022.01)
*H04L 9/00* (2022.01)

(52) U.S. Cl.
CPC ........... *G06F 2009/4557* (2013.01); *G06F 2009/45595* (2013.01); *H04L 9/50* (2022.05)

(56) References Cited

U.S. PATENT DOCUMENTS

2017/0366416 A1* 12/2017 Beecham ............... H04L 45/50
2020/0366493 A1* 11/2020 Sood ..................... H04L 9/3239

OTHER PUBLICATIONS

Shao et al. (Blockchain-Based SDN Security Guaranteeing Algorithm and Analysis Model, WiSATS 2019: Wireless and Satellite Systems pp. 348-362, online May 7, 2019) (Year: 2019).*

Xue et al. (Research on Key Technologies of Software-Defined Network Based on Blockchain, IEEE, May 6, 2019) (Year: 2019).*

VCloud Air (VMware vCloud Air Networking Guide, WMWARE, 2014, 46 pages) (Year: 2014).*

RouterSwitch Tech (Tips & Examples: Configuring a GRE Tunnel, 3 pages, Nov. 29, 2012) (Year: 2012).*

Kataoka et al. (Trust List: Internet-wide and Distributed IoT Traffic Management using Blockchain and SDN, IEEE 2018, 6 pages) (Year: 2018).*

Krishna (Providing End-to-end Bandwidth Guarantees with OpenFlow, Master of Science Thesis, 2016, 95 pages) (Year: 2016).*

* cited by examiner

BLOCKCHAIN-POWERED CLOUD MANAGEMENT SYSTEM

CROSS REFERENCE TO RELATED APPLICATIONS

This application claims the benefit of U.S. provisional patent application Ser. No. 62/850,636 entitled "Blockchain-Powered Cloud Management System," filed May 21, 2019, and incorporated herein by reference in its entirety.

STATEMENT REGARDING FEDERALLY SPONSORED RESEARCH OR DEVELOPMENT SUPPORT

This invention was made with government support under 80NSSC17K0530 awarded by the National Aeronautics and Space Administration (NASA). The government has certain rights in the invention.

NAMES OF THE PARTIES TO A JOINT RESEARCH AGREEMENT

The present application stems from work done pursuant to a Joint Research Agreement between The University of Akron of Akron, Ohio and the U.S. National Aeronautics and Space Administration (NASA).

FIELD OF THE INVENTION

One or more embodiments of the present invention relates to cloud computing. In certain embodiments, the present invention is directed to a blockchain-powered cloud management system.

BACKGROUND OF THE INVENTION

The "Cloud" is a vast network of remote servers around the globe, which are interconnected and meant to operate as a single ecosystem. The market penetration for cloud services has been increasing in recent years due to its extensive benefits, such as high-valued flexibility, efficiency and strategic value. Due to its high penetration signified by the benefits, cloud architecture has become a "necessity" more than just a "choice" nowadays. However, there remain essential challenges for managing the cloud architecture, such as cloud security that can be compromised due to various factors. Cloud servers, which are divided geographically, typically use their own dedicated networking infrastructure. For example, Google Cloud Platform uses its own fiber to inter-connect various geographically separated facilities. When these Cloud Service Providers (CSPs) can not sufficiently support their own cloud infrastructure, they may rely on a third party for the networking services. This reliance on third-party networking services, whose trustworthiness cannot be guaranteed, raises additional security concerns. Various techniques have been proposed to enhance the security of the networking support of cloud architecture. Some have proposed a mechanism to detect conflicting software-defined networking (SDN) related flow rules in highly dynamic cloud computing environments. Others have proposed a game-theoretic approach to detect distributed denial of service (DDOS) attacks in cloud environments by leveraging the programmability of SDN. These techniques are effective in managing the cloud environment. However, since the critical state variables are stored within a controller, sophisticated attacks can be launched to manipulate these variables. An SDN-based framework has also been proposed for cloud security that utilizes a centralized Security Manager to detect the falsely injected packets. This framework has proven effective when the centralized security manager works normally. However, due to its centralized nature, the security manager is highly susceptible to single point of failure, which can result in compromising the entire security layer.

SDN is a promising technology that removes the control plane from individual switches and transfers it to a centralized controller having the topological view of the entire network. This technology outperforms the conventional decentralized TCP/IP networking infrastructure by enabling comprehensive end-to-end controls with low-operational cost, having programmable hardware, and achieving automated decision making in network management. The rich southbound APIs are used to realize the network as well as push necessary configurations to the data plane switches. Therefore, in recent decades, SDN technologies have gained widespread popularity in different application fields, in which SDNs are used to establish the connectivity and traffic shaping amongst geographically separated hosts (i.e. physical servers) as well as logically separated tenants (i.e. virtual machines) in cloud architecture.

Blockchain is an emerging technology, which can be considered as an immutable and decentralized digital ledger. A blockchain is a growing list of records, called blocks, which are linked via cryptography. Each block contains the hash value of the previous block, the transaction data, and the timestamp. Due to the inherent cryptographic chaining, if a malicious party tries to manipulate certain transaction data, it will cause changes of the hash values of the block containing the transaction and those of all the subsequent blocks, which can be easily detected. For these and other reasons, blockchain technology is believed to provide a very promising solution for integrity security.

What is needed in the art is a networking infrastructure to improve the transparency of the networking entities and enhance the security of the networking service that can be applied to both private and public clouds and exploits SDN and blockchain technologies.

SUMMARY OF THE INVENTION

As set forth above, cloud architecture has become a valuable solution for many different applications, such as big data analytics, due to its high-degree availability, scalability and strategic value. However, as also set forth above, cloud security remains a significant challenge in managing cloud architecture. In various embodiments, the present invention utilizes software-defined networking (SDN) and blockchain technologies to secure the cloud management from the networking perspective. In one or more embodiment, the present invention relates to a blockchain-powered SDN-enabled networking infrastructure in which the integration between blockchain-based security and autonomy management layer and multi-controller SDN networking layer is defined to enhance the integrity of the control and management messages. In some of these embodiments, the present invention uses a multi-controller SDN networking layer with the southbound protocol that uses OpenFlow 1.3. In various embodiments, the present invention utilizes Ethereum™ blockchain platform and imposes security functionalities automatically via smart contract. In some embodiments, the networking infrastructure of the present invention also enables the autonomous bandwidth provisioning to enhance the availability of cloud architecture.

In a first aspect, the present invention is directed to a blockchain-powered cloud management system comprising: a multi-controller software-defined networking (SDN) layer having two or more networked SDN controllers; a cloud management layer; wherein said cloud management layer comprises one or more of data domains containing one or more virtual machines, wherein said virtual machines are connected to at least one of said two or more networked SDN controllers SDN controller through a domain switch and wherein said one or more of data domains are networked together through one or more domain edge switches; and a blockchain-based security and management layer, wherein said blockchain-based security and management layer comprises a decentralized blockchain database connected to each of said two or more networked SDN controllers. In one or more of these embodiments, one or more of said data domains are a data center comprising a domain edge switch and one or more physical servers, wherein each physical server contains at least one domain switch with one or more virtual machines operatively connected thereto, wherein said at least one domain switch is connected to at least one of said two or more networked SDN controllers SDN controller.

In one or more embodiments, the blockchain-powered cloud management system of the present invention includes any one or more of the above referenced embodiments of the first aspect of the present invention wherein said two or more data domains are connected in a peer-to-peer fashion. In one or more embodiments, the blockchain-powered cloud management system of the present invention includes any one or more of the above referenced embodiments of the first aspect of the present invention wherein said two or more networked SDN controllers are connected in a peer-to-peer fashion.

In some, the blockchain-powered cloud management system of the present invention includes any one or more of the above referenced embodiments of the first aspect of the present invention wherein said domain edge switches are connected to each other by Generic Routing Encapsulation (GRE) tunnels. In one or more embodiments, the blockchain-powered cloud management system of the present invention includes any one or more of the above referenced embodiments of the first aspect of the present invention wherein the virtual SDN switch and domain edge switches in a data center location are connected to each other by Generic Routing Encapsulation (GRE) tunnels.

In one or more embodiments, the blockchain-powered cloud management system of the present invention includes any one or more of the above referenced embodiments of the first aspect of the present invention wherein said blockchain-based security and management layer further comprises blockchain middleware installed on each of said two or more networked SDN controllers. In one or more embodiments, the blockchain-powered cloud management system of the present invention includes any one or more of the above referenced embodiments of the first aspect of the present invention wherein blockchain-based security and management layer further comprises one or more digital smart contracts. In one or more embodiments, the blockchain-powered cloud management system of the present invention includes any one or more of the above referenced embodiments of the first aspect of the present invention wherein said domain edge switches are OpenFlow-enabled switches.

In one or more embodiments, the blockchain-powered cloud management system of the present invention includes any one or more of the above referenced embodiments of the first aspect of the present invention wherein each of said virtual machines is assigned a unique IP address. In one or more embodiments, the blockchain-powered cloud management system of the present invention includes any one or more of the above referenced embodiments of the first aspect of the present invention wherein any one of said two or more networked SDN controllers is configured to send at least one of control commands and/or management commands to any one or more of said virtual machines in said cloud management layer.

In a second aspect, the present invention is directed to a method for verifying the integrity of control or management commands in a cloud platform using the blockchain-powered cloud management system described above, the method comprising: receiving or generating a control or management command in one of said two or more networked SDN controllers, wherein said control or management command comprises message data and a time stamp; generating a first hash value for said message data and a second hash value for said time stamp, which are then combined to form a sent message hash value for said control or management command; recording said sent message hash value in a blockchain database in said blockchain-powered cloud management system; sending the control or management command to a second networked SDN controller designated and configured to receive said control or management command; identifying a received message data and a received time stamp in the control or management command received by the second networked SDN controller and generating a third hash value for the received message data and a fourth hash value for the received time stamp, which are then combined to form a received message hash value for said received control or management command; and comparing the received message hash value to the sent message hash value saved in said blockchain database to verify the integrity of control and management command received by said second networked SDN controller. In one or more of these embodiments, the step of recording said sent message hash value in said blockchain database comprises recording said sent message hash value as a state value in a smart contract in said blockchain-based security and management layer and the step of comparing comprises comparing the received message hash value to the sent message hash value stored as a state value in the smart contract on said blockchain-based security and management layer.

In a third aspect, the present invention is directed to a method for detection malicious hosts in a cloud platform using the blockchain-powered cloud management system of described above, the method comprising: identifying one or more of said two or more networked SDN controllers in said multi-controller software-defined networking (SDN) layer as a valid host, wherein each valid host has a unique Media Access Control (MAC) address; assigning a unique Internet Protocol (IP) address to each MAC address, so that each MAC address has a corresponding IP address; recording the association of said IP address and MAC address for each valid host to blockchain-based security and management layer; receiving a request from a source host; and determine whether said source host has, or purports to have, a unique IP address and a MAC address and if not, discarding the request; if the source host has, or purports to have, a unique IP address and a MAC address, determining whether the source host unique IP address and a MAC address pair have been saved in the blockchain-based security and management layer and is a valid host, and if, not discarding the request as coming from a potentially malicious host.

In a fourth aspect, the present invention is directed to a method for autonomous bandwidth allocation in the blockchain-powered cloud management system described above, wherein said blockchain-powered cloud management system described above has a guaranteed flow and a best effort flow, the method comprising: saving a SLA definition table created according to instructions saved in a blockchain smart contract in the blockchain-based security and management layer of the blockchain-powered cloud management system described above, wherein said SLA definition table comprising a bandwidths for corresponding SLA source-destination pairs, said SLA source-destination pairs comprising pairs of source IP addresses and destination IP addresses; defining an inter-controller link bandwidth matrix that records all links connecting the SDN controllers of said multi-controller software-defined networking (SDN) layer and their available bandwidths according to instructions saved in the blockchain smart contract in the blockchain-based security and management layer of the blockchain-powered cloud management system described above, and defining an intra-controller link bandwidth matrix that records the bandwidths of all the available links within the data domains of each SDN controllers, including links between said data domains of each SDN controllers, according to instructions saved in said blockchain smart contract in the blockchain-based security and management layer of the blockchain-powered cloud management system described above; producing or generating a provisioning request having a source-destination pair comprising a source IP addresses and destination IP address and designating said for said guaranteed flow; determining whether the source-destination pair for said provisioning request exists in said SLA definition table, and if not discard said provisioning request; determining whether the source IP address and destination IP address are in the same data domain or its associated. SDN controller; if the source IP address and destination IP address are in the same data domain or its associated SDN controller, finding the unallocated bandwidth along an appropriate path from the source IP address and destination IP address and determining whether said unallocated bandwidth is greater than the bandwidth for the SLA source-destination pair saved in the blockchain-based security and management layer of the blockchain-powered cloud management system described above; releasing the allocation request into a guaranteed queue if the unallocated bandwidth for said appropriate path is greater than the bandwidth for the SLA source-destination pair saved in the blockchain-based security and management layer and determining whether there is an alternative path if the unallocated bandwidth is not greater than the bandwidth for the SLA source-destination pair saved in the blockchain-based security and management layer; repeating the step if there is an alternative path and releasing the allocation request into the best efforts queue and then periodically rechecking to see if unallocated bandwidth for said appropriate path is greater than the bandwidth for the SLA source-destination pair saved in the blockchain-based security and management layer and releasing the allocation request to the guaranteed queue if the unallocated bandwidth for said appropriate path is greater than the bandwidth for the SLA source-destination pair saved in the blockchain-based security and management layer; if the source IP address and destination IP address are not in the same data domain or its associated SDN controller, finding the unallocated bandwidth along a shortest path from the source IP address and destination IP address and determining whether that unallocated bandwidth for said shortest path is greater than the bandwidth for the SLA source-destination pair saved in the blockchain-based security and management layer of the blockchain-powered cloud management system described above; and releasing the allocation request into a guaranteed queue if the unallocated bandwidth for said shortest path is greater than the bandwidth for the SLA source-destination pair saved in the blockchain-based security layer and releasing the allocation request into a best effort queue if the unallocated bandwidth for said shortest path is greater than the bandwidth for the SLA source-destination pair saved in the blockchain-based security layer and then periodically rechecking to see if unallocated bandwidth for said shortest path is greater than the bandwidth for the SLA source-destination pair saved in the blockchain-based security and management layer, and releasing the allocation request to the guaranteed queue if the unallocated bandwidth for said shortest path is greater than the bandwidth for the SLA source-destination pair saved in the blockchain-based security and management layer.

BRIEF DESCRIPTION OF THE DRAWINGS

For a more complete understanding of the features and advantages of the present invention, reference is now made to the detailed description of the invention along with the accompanying figures in which:

(FIG. 11A) the terminal for C1 when sending (Address Resolution Protocol) ARP request, (FIGS. 11B-C) the terminals for C0 and C2 after receiving the ARP request, and (FIGS. 11D-E) the terminal for C0 when ARP reply is generated and the terminal of C1 when ARP reply is verified upon reception.

DETAILED DESCRIPTION OF THE ILLUSTRATIVE EMBODIMENTS

Figure 1:
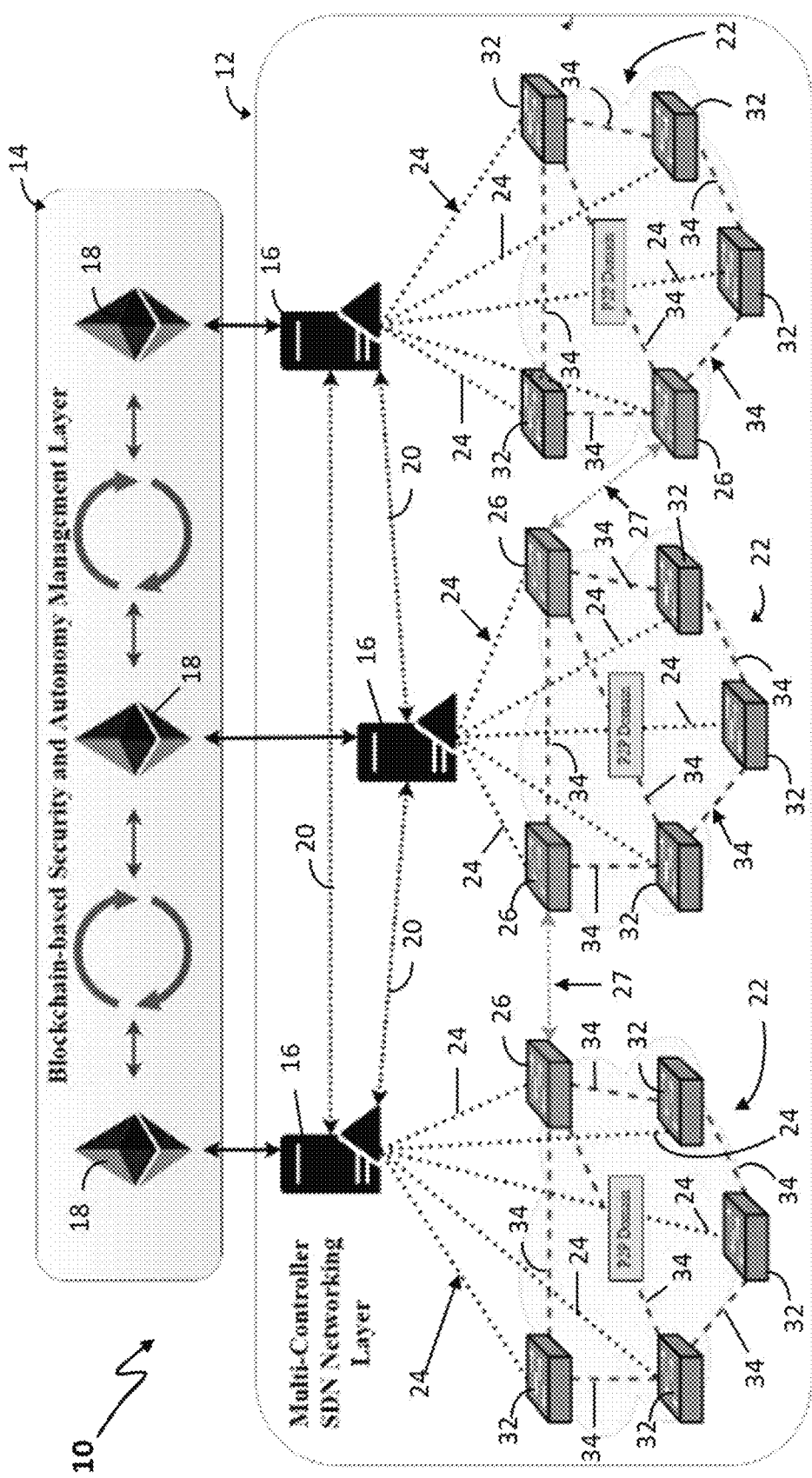
FIG. 1 is a schematic overview of a blockchain-powered SDN-enabled networking infrastructure according to one or more embodiments of the present invention.

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure.

In one or more embodiment, the present invention relates to a blockchain-powered SDN-enabled networking infrastructure in which the integration between blockchain-based security and autonomy management layer and multi-controller SDN networking layer is defined to enhance the integrity of the control and management messages. In some of these embodiments, the present invention uses a multi-controller SDN networking layer with the southbound protocol that uses OpenFlow 1.3. In various embodiments, the present invention utilizes Ethereum™ blockchain platform and imposes security functionalities automatically via smart contract. In some embodiments, the networking infrastructure of the present invention also enables the autonomous bandwidth provisioning to enhance the availability of cloud architecture.

The following terms may have meanings ascribed to them below, unless specified otherwise. As used herein, the terms "comprising" "to comprise" and the like do not exclude the presence of further elements or steps in addition to those listed in a claim. Similarly, the terms "a," "an" or "the" before an element or feature does not exclude the presence of a plurality of these elements or features, unless the context clearly dictates otherwise.

In addition, the following acronyms may be used herein and will have the following meanings: ARP (Address Resolution Protocol (e.g., qualifying ARP request-reply pair)), BW (band width), (CSP) cloud service provider, DC (data center), DDOS (distributed denial of service), DHCP (Dynamic Host Configuration Protocol), GRE (Generic Routing Encapsulation. (e.g., GRE tunnels)), IETF (The Internet Engineering Task Force), IoT (Internet of Thing), IP (Internet protocol (address)), LISP (Locator ID Separation Protocol), MAC (Media Access Control (address)), P2P (peer-to-peer), QoE (Quality of Experiences), QoS (Quality of Service), SDN (software-defined networking), SLAB (Service Level. Agreements), STTP (Stateless Transport Tunneling Protocol), VXLAN (Virtual eXtensible Local Area Network), VMs (virtual machines), VM IP (virtual machine internet protocol (address)), and VMM (virtual machine monitor).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term "about."

It should be also understood that the ranges provided herein are a shorthand for all of the values within the range and, further, that the individual range values presented herein can be combined to form additional non-disclosed ranges. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

Figure 2:
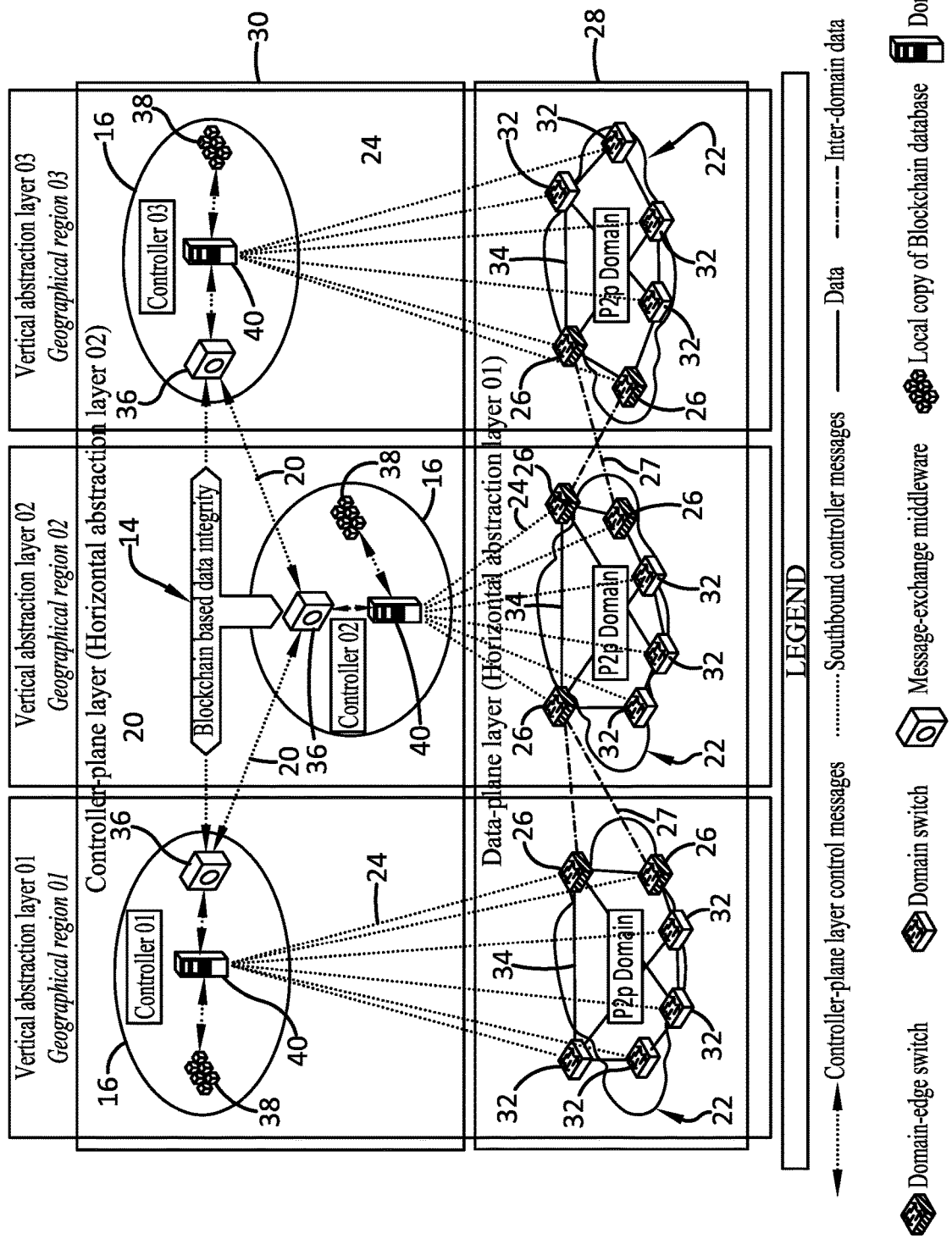
FIG. 2 is a schematic diagram showing the multi-controller SDN networking layer and data plane layer of a blockchain-powered cloud management system according to one or more embodiments of the present invention.
Figure 3:
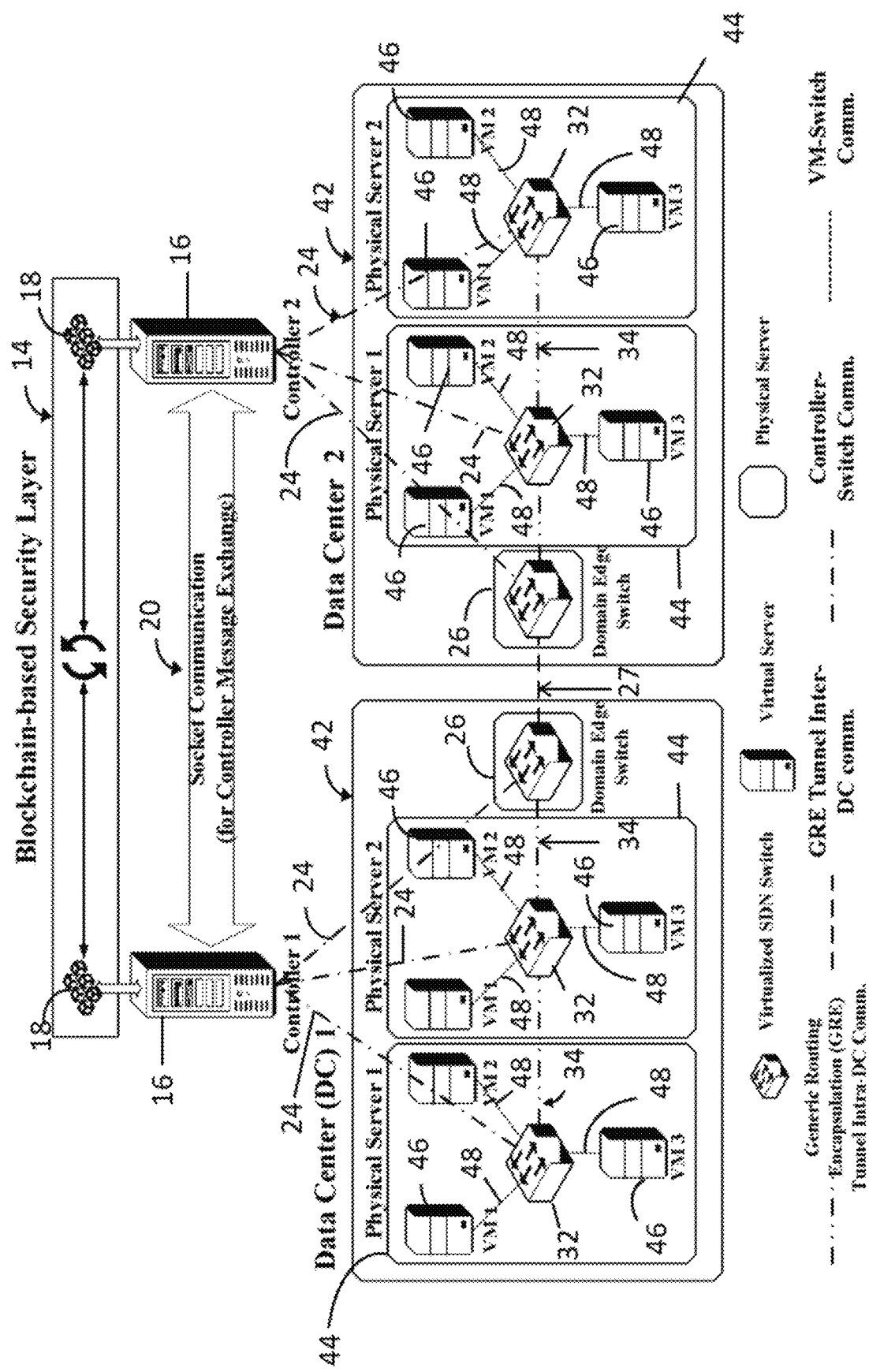
FIG. 3 is a schematic overview of a blockchain-powered cloud management system according to one or more embodiments of the present invention.

An overview of a blockchain-powered SDN-enabled networking infrastructure 10 according to various embodiments of the present invention is illustrated in FIG. 1. As can be seen, networking infrastructure 10 mainly comprises two layers: (1) multi-controller SDN networking layer 12, and (2) blockchain-based security and autonomy management layer 14. The interaction between these two layers is realized by connecting the SDN controllers 16 through a blockchain-based autonomous security system 18, as shown in FIGS. 1-3. Overall, this networking infrastructure is developed to realize three main functionalities: (1) integrity verification for control and management commands for cloud platforms, (2) identification of the malicious hosts abusing the cloud platform, and (3) enhancing the availability of the cloud platform via autonomous bandwidth provisioning.

As will be understood by those of skill in the art, there are primarily two strategies for designing multi-controller SDN networking systems: (1) horizontal architecture, in which the controllers are interconnected in a peer-to-peer fashion, and (2) hierarchical architecture, in which all the controllers are connected to one centralized controller responsible for controller management. One major drawback of the hierarchical architecture is that the centralized controller is highly vulnerable to single point of failure. Accordingly, multi-controller SDN networking layer 12 uses a horizontal architecture, as can be seen in FIGS. 1-3.

As set forth above, the multi-controller SDN networking layer 12 contains two or more SDN controllers 16 networked in a peer-to-peer fashion. The number of SDN controllers 16 in the multi-controller SDN networking layer 12 is not particularly limited and any number of SDN controllers 16 may be used. In some embodiments, multi-controller SDN networking layer 12 will have from 2 to about 1000 SDN controllers. SDN controllers 16 are networked together via a series of controller-controller communications lines 20, as shown in FIGS. 1-3, and described above.

Each SDN controller 16, is connected to one or more peer-to-peer (P2P) domains 22 through southbound connections 24. In various embodiments, each domain 22 may comprise collection of SDN switches which connects with each other in a peer-to-peer fashion. The number of switches within a domain depends on the computational/memory capacity of the SDN controller that serves the domain. In a cloud data center, a VM's uplink is connected to a SDN switch in a domain. In one or more embodiments, the SDN switches will comprise domain-edge switches 26 and domain switches 32, as outlined below.

To realize networking, both intra-domain and inter-domain communication are enabled as shown in FIGS. 1-3. Different domains 22 are connected with each other in a decentralized manner via domain-edge switches 26 and inter-domain connections 27, to form the data plane backbone network (data-plane layer 28), while the different SDN controllers 16 are connected with each other to form decentralized controller plane 30 (See FIG. 2). In one or more embodiments, domain edge switches 26 are OpenFlow-enabled switches intra-domain traffic may be handled by one or more domain switches 32 via intra-domain connections 34. (See, FIGS. 1-3)

In one or more embodiments, each of said SDN controllers 16 is configured to interface with: (i) one or more other SDN controllers 16 via installed communications middleware 36 running through controller-controller communications lines 20; (ii) the blockchain based security and autonomy layer 14 via installed blockchain middleware 38, and (iii) at least one P2P domain 22, via southbound control lines 24, as shown in FIGS. 1-3. The specific mechanisms for connecting the SDN controllers 16, blockchain-based security and autonomy management layer 14 and P2P domains 22 are not particularly limited and any suitable means and/or protocols may be used.

In various embodiments, controller-controller communications lines 20 and southbound control lines 24 may be any suitable wired or wireless connection. In some embodiments, controller-controller communications line 20 may be a user datagram protocol (UDP) socket connection or a Transmission Control Protocol (TCP) socket connection. In some of these embodiments, UDP socket connections are used for controller-to-controller communication during normal operation. In some embodiments, southbound control lines 24 may be wired/wireless communications enabled by a conventional southbound protocol, such as OpenFlow™ (Open Networking Foundation (ONF), Menlo Park, CA), NETCONF (RFC 6241); P4 Runtime (P4.org's API working group) or Simple Network Management Protocol (SNMP) (Internet Engineering Task Force (IETF), Fremont, CA).

As set forth above, the domains 22 forming the data-plane layer 28 are networked together via domain edge switches 26 by inter-domain connections 27. In various embodiments, inter-domain connections 27 may be any suitable wired or wireless connection of sufficient bandwidth. In embodiments where inter-domain connections 27 lacks sufficient bandwidth, this may still be addressed via a networking management mechanism, such as via the functionality of queuing. In one or more embodiments, domain edge switches 26 are connected to each other by Generic Routing Encapsulation (GRE) tunnels, but the invention is not so limited, and any suitable encapsulation protocol may be used. Other suitable encapsulation protocols may include, without limitation, Geneve (The Internet Engineering Task Force (IETF) (draft status—not expired) available at https://tools.ietf.org/html/draft-ietf-nvo3-geneve-13); Virtual eXtensible Local Area Network (VXLAN) (RFC 7348); Stateless Transport Tunneling Protocol (STT) (IETF (draft status—expired), available at https:/tools.ietf.org/html/draft-davie-stt-08), and Locator ID Separation Protocol (LISP) (RFC 6830)

In various embodiments, each SDN controller 16 will be contain at least one computer, controller, microcontroller, microprocessor, server, or other piece of logic-based computing equipment (controller 40) capable of running suitable message-exchange middleware 36, suitable blockchain middleware 38, and other SDN related protocols. SDN controllers 16 should have sufficient computing power to run not only the suitable message-exchange and blockchain middleware 36, 38 as set forth above, but also be able to send and receive messages from the other SDN controllers 16, make decisions regarding network management, conduct security verification with the blockchain based security and autonomy layer 14, and implement other functionalities to enhance network intelligence and resilience. In some embodiments, the controller 40 in each of the SDN controller 16 will contain memory and a processing unit (PU). In some embodiments, the controller 40 in one or more of the SDN controller 16 may be a Network Interface Card (MC). In various embodiments, each of the SDN controller 16 will contain a processing unit (PU) and a Network Interface Card (NIC).

Message-exchange middleware 36 is not particularly limited and may be any conventional networking software used to form SDN networks capable of being stored, loaded, and run by SDN controllers 16. In the embodiment shown in FIG. 2, the message-exchange middleware 36 is installed on, and run by, controller 40. Suitable message-exchange middleware 36 may include, but is not limited to, data management and communication software, an application programming interface, or a combination thereof.

As set forth above, SDN controllers 16 are also networked together through a blockchain based security and autonomy layer 14 implemented through blockchain middleware 38 installed upon these devices. Blockchain middleware 38 is not particularly limited and may be software for running any conventional blockchain system/platform 18 used with SDN networks that has smart contract functionality, and is capable of being stored, loaded, and run by SDN controllers 16. In various embodiments, blockchain middleware 38 will contain a copy of a blockchain database (not shown) that is shared with the other SDN controllers 16 forming the multi-controller SDN networking layer 12, as is known in the art. In some embodiments, the blockchain platform 18 may be Ethereum™ (Ethereum Foundation, Zug, Switzerland), Ethereum™ Classic, EOS (block.one, Arlington, VA), DFINITY (DFINITY, Zug, Switzerland), or Hyperledger™ (The Linux Foundation, San Francisco, CA), all of which have engines and languages for implementing/executing smart contracts, run through the appropriate blockchain middleware 38 for the platform loaded onto the SDN controllers 16. In some embodiments, the blockchain platform 18 is the Ethereum™ platform. The Ethereum platform is an open-source, public, blockchain-based distributed computing platform and operating system featuring smart contract functionality. In these embodiments, the necessary software for running the Ethereum platform, including the engine Ethereum™ Virtual Machine (EVM) and language Solidity used to generate the smart contracts, will be installed on all participating SDN controllers 16. The terms "smart contract" and "digital smart contract" are used herein interchangeably to refer to a program executed on a blockchain platform having the ability to execute scripts, i.e., programming language that supports programs written for a run-time environment that automates the execution of tasks.

In various embodiments, blockchain based security and autonomy layer 14 will use digital smart contracts in connection with blockchain platform 18 to manage SLA definitions tables in a trusted manner and keep track of available bandwidths throughout the network.

In one or more embodiments, blockchain-powered SDN-enabled networking infrastructure 10 may be configured as shown in FIG. 3. In these embodiments, the SDN controllers 16 are networked through controller communications lines 20 and the blockchain based security and autonomy layer 14, as discussed above. In these embodiments, the each SDN controller 16 will be controllably connected to a data center 42 through southbound connections 24. In various embodiments, data center 42 may be a collection of physical servers.

In the embodiment shown in FIG. 3, each data center 42 will contain one or more physical servers 44 and at least one domain edge switch 26. In some embodiments, physical servers 44 are cloud servers. As used herein, the term "cloud server" refers to virtual server running in a cloud computing environment. In various embodiments, the one or more domain edge switches 26 in each data center 42 will be as described above.

In the embodiment shown in FIG. 3, the data centers 42 are connected to each other by inter-domain connections 27 running between the edge domain switches 26 in the various data centers 42. In these embodiments, the data centers 42 are connected with each other in a decentralized manner via domain-edge switches 26 and inter-domain connections 27, to form the data plane back-bone network (data-plane layer 28), as described above. In these embodiments, data center 42 functions in the same way as domain 22 in FIGS. 1 and 2. The one or more domain edge switches 26 and inter-domain connections 27 may be as described above.

All of the domain switches 32 and domain edge switches 26 in a particular data center 42 are connected to the SDN controller 16 for that data center by southbound connections 24 and to each other through intra-domain connections 34. As set forth above, these connections may be accomplished by any suitable means. In various embodiments, southbound connections 24 may be wired/wireless communications enabled by-southbound protocols, such as OpenFlow™ (Open Networking Foundation (ONF), Menlo Park, CA), NETCONF (RFC 6241); P4 Runtime (P4.org's API working group) or Simple Network Management Protocol (SNMP) (Internet Engineering Task Force (IETF), Fremont, CA), as set forth above. In the embodiment shown in FIG. 3, intra-domain connections 34 are Generic Routing Encapsulation (GRE) tunnels, but the invention is not so limited. Other suitable encapsulation protocols that may be used include, without limitation, Geneve (The Internet Engineering Task Force (IETF) (draft status—not expired) available at https://tools.ietf.org/html/draft-ietf-nvo3-geneve-13); Virtual eXtensible Local Area Network (VXLAN) (RFC 7348); Stateless Transport Tunneling Protocol (STT) (IETF (draft status—expired), available at https://tools org/html/draft-davie-stt-08), and Locator ID Separation Protocol (LISP) (RFC 6830). In one or more embodiments, intra-domain connections 34 may be GRE or another similar technology. In various embodiments, communications line 48 running between domain switch 32 and each of the virtual machines/servers 46 in the physical server 42 may be GRE or another similar technology.

The data centers 42 in FIG. 3 are shown having two physical servers 44. However, the number of physical servers 44 is not particularly limited provided that the physical servers 44 are all connected to at least one domain edge switch 26. In one or more of these embodiments, the minimum number of physical servers 44 will be 1 and the maximum number is limited only by the capacity(memory/processing) of the SDN controller 16. In one or more embodiments, data center 42 may contain from 1 to 100, in other embodiments, from 1 to 50, in other embodiments, from 1 to 25, in other embodiments, from 1 to 10, in other embodiments, from 10 to 100, in other embodiments, from 25 to 100, in other embodiments, from 50 to 100 physical servers 44.

Each of the one or more physical servers 44 will contain at least one domain switch 32, which may be a virtualized SDN switch or a physical switch, and a least one virtual machine or virtual server 46 connected to domain switch 32 by a communications line 48. In one or more of these embodiments, domain switch 32 is a virtual SDN switch and the domain switches 32 and domain edge switches 26 in a data center 42 are connected to each other by Generic Routing Encapsulation (GRE) tunnels. Other suitable encapsulation protocols that may be used include, without limitation, Geneve (The Internet Engineering Task Force (IETF) (draft status—not expired) available at https://tools.ietf.org/html/draft-ietf-nvo3-geneve-13); Virtual eXtensible Local Area Network (VXLAN) (RFC 7348); Stateless Transport Tunneling Protocol (SIT) (IETF (draft status—expired), available at https://tools.ietf.org/html/draft-davie-stt-08), and Locator ID Separation Protocol (LISP) (RFC 6830). Suitable virtual SDN switches may include, without limitation, Open vSwitch™ (Linux Foundation, San Francisco, CA).

Figure 4:
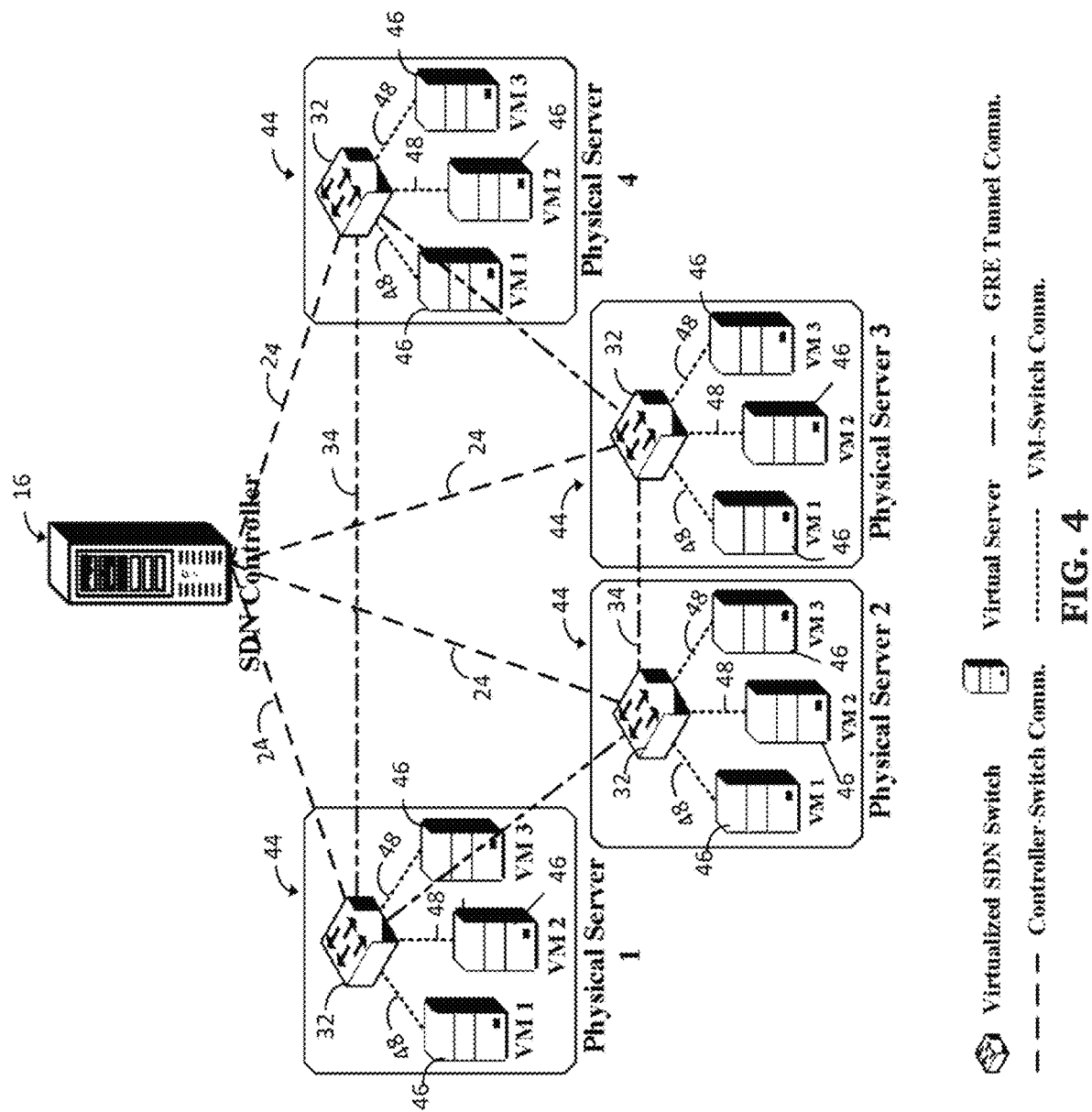
FIG. 4 is a schematic illustration of an example data center of a cloud management system according to one or more embodiments of the present invention.

The terms "virtual machine" or "virtual server" are used herein interchangeably to refer to a logical entity inside physical server 44, having an assigned IP address. In some embodiments, virtual machine/server 46 will be a logical computer that runs an operating system and related applications. As set forth above, the cloud servers will comprise virtual machines and virtual servers. As can be seen in FIGS. 3 and 4, each physical server 44 hosts several virtual machines/servers 46. In these embodiments, a virtual machine monitor (VMM) (also referred to as a "hypervisor") (not shown) is responsible provisioning these virtual machines/servers 46. As will be understood by those in the art, a VMM is a is a software program that enables the creation, management and governance of virtual machines and manages the operation of a virtualized environment on top of a physical host machine. Suitable VMMs may include, but are not limited to, Xen Project, ORACLE™ VM Server (Oracle Corporation, Santa Clara, CA), VMware ESXI™ (VMWare, Inc., Palo Alto, CA). In the embodiment shown in FIGS. 3 and 4, the VMM is a VM-creation software installed on a bare metal physical server.

The physical servers 44 shown in FIG. 3 each host three virtual machines/servers 46 connected through domain switch 32, but the invention is not so limited. In these embodiments, the physical servers 44 will include at least one virtual machines/servers 46. As will be apparent to those of skill in the art, the maximum number of virtual machines/servers 46 a physical server can host will depend upon the capacity of the physical server 44. In some of these embodiments, physical server 44 will be a multi-tenant physical server (i.e., multiple tenants share the same physical resource). In some embodiments, physical server 44 will be a bare-metal physical server. In some embodiments, physical servers 44 may host from 1 to 20, in other embodiments, from 1 to 10, in other embodiments, from 1 to 5, in other embodiments, from 5 to 20, in other embodiments, from 10 to 20, and in other embodiments, from 15 to 20 virtual machines/servers 46.

As can be seen, each domain switch 32 is also operatively connected to an SDN controller 16 by southbound connections 24, as described above. Generally, all of the domain switches 32 in a physical server are connected to the same SDN controller 16 as shown in FIGS. 3 and 4, but that need not be the case. In the embodiments shown in FIGS. 3 and 4, the SDN controller 16 does not directly interact with virtual machines/servers 46. Instead, all the virtual machines/servers 46 within a physical server 44 interact through a virtualized SDN switch (domain switch 32). Based on the flow rules installed in the virtualized SDN switch by the SDN controller, the switch will establish communication between virtual machines/servers 46. In various embodiments, the networked. SDN controllers are configured to send control and/or management commands any one or more of virtual machines/servers 46 through the SDN controller connected to the physical server 44 hosting the virtual machines/servers 46 in question.

In some other embodiments, each SDN controller 16 may be networked directly to one or more physicals servers 44, as is shown in FIG. 4. In these embodiments, the one or more physicals servers 44 need not part of a datacenter 42, and may be remote from each other, but is otherwise configured as shown in FIG. 3. For each domain, there is one or multiple domain-edge switches which connects with another domain's domain edge switch (See, e.g., FIGS. 1-3). Each domain's data is transferred to other domains via domain-edge switches 26. In one or more of these embodiments, the SDN controllers 16 will collectively setup necessary flow rules to enable inter-domain routing.

As set forth above, this networking infrastructure may be used to realize three main functionalities: (1) integrity verification for control and management commands for cloud platforms, (2) identification of the malicious hosts abusing the cloud platform, and (3) enhancing the availability of the cloud platform via autonomous bandwidth provisioning. The present invention represents a substantial improvement in the technology in at least these areas.

Integrity Verification Mechanism

In one or more embodiment, the blockchain-powered cloud management system of the present inventions further comprises a verification mechanism designed to verify the integrity of the control and management commands for the cloud platform. This mechanism is realized via the interaction between the multi-controller SDN networking layer and the blockchain-based security and autonomy management layer. Whenever an SDN controller is ready to send a control/management command, it generates a combined hash of the command data and the timestamp associated with the command. In some embodiments, the combined hash value is calculated via MD5 message-digest algorithm (See, R. L. Rivest, "The MD5 Message Digest Algorithm," RFC 1321-4-1992, the disclosure of which is incorporated herein by reference in its entirety). Then the SDN controller records the combined hash value as a stated variable in a smart contract in the blockchain-based layer. After generating and recording the hash value, the controller sends the control command with the timestamp to the targeted SDN controller (receiver). After receiving the command, the controller verifies the integrity of the command by hashing the received information, including the command and its associated timestamp, and checking against the blockchain smart contract to find out whether the aforementioned hash was previously generated in the system.

Additionally, the receiver can store the hash values in a buffer if it receives various control commands from the controllers. To avoid interrupting the communications with critical latency criteria, if it is necessary, the receiver can directly deploy received control commands without verifying the integrity. In the meantime, the buffered hash values are verified against the hash values recorded via the state variables in smart contracts.

Figure 5:
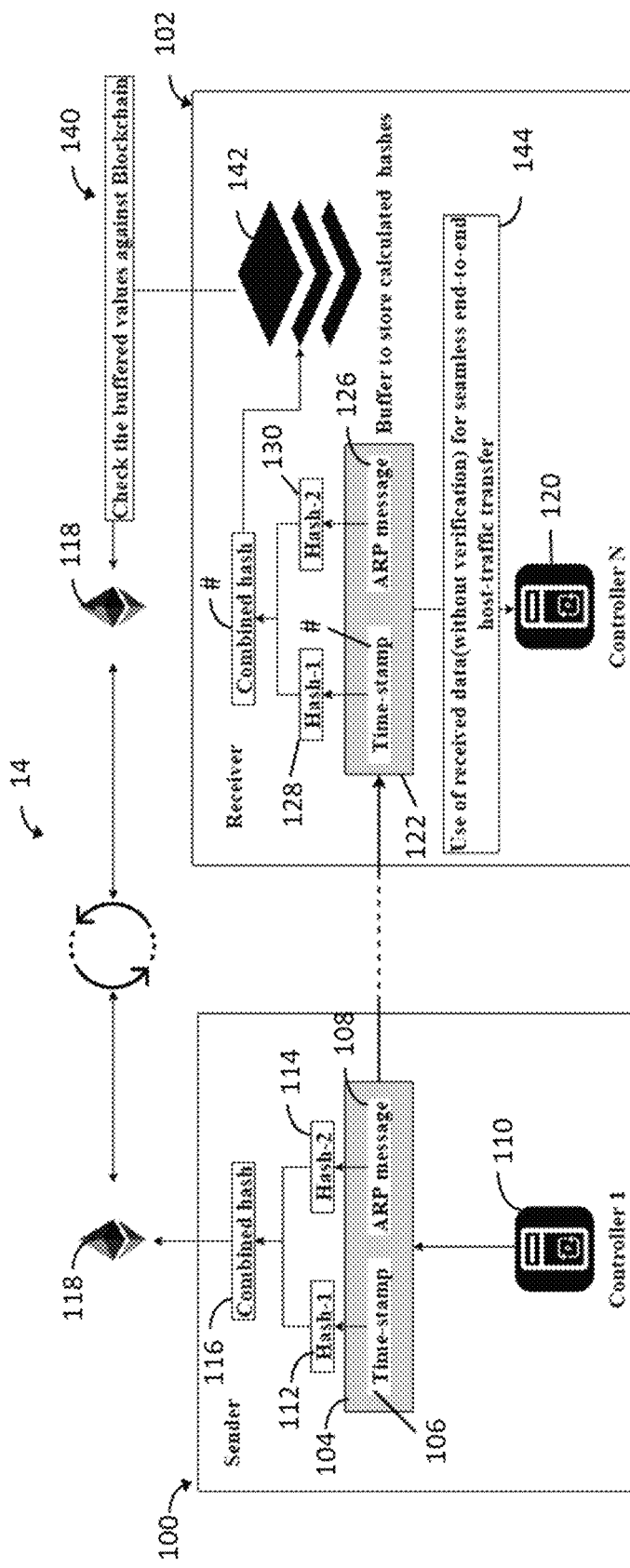
FIG. 5 is a schematic diagram illustrating an integrity verification mechanism according to one or more embodiments of the present invention.

The integrity verification mechanism of one or more embodiments of the present invention is outlined in more detail in FIG. 5. In these embodiments, blockchain based security and autonomy layer 14 secures the control commands sent from/to the SDN controllers 100, 102 and enables the secure, autonomous, and decentralized cooperation among SDN controllers 100, 102. As can be seen in FIG. 5, an original control signal 104 having a time stamp 106 and control message data 108 ("ARP message") is generated in a controller 110 ("Controller 1" in FIG. 5) in SDN controller 100. A hash value 112 ("Hash 1") is generated for the time stamp 106 and a second hash value 114 ("Hash 2") is generated for the control message data 108. These are then combined to form a hash value unique to the original control signal (original "Combined hash" 116), which is saved to a blockchain database 118 in the blockchain based security and autonomy layer 14. The original control signal 104 is then transmitted to a second. SDN controller 102 at "Controller N" 120 as received control signal 122. The second controller ("controller N") 120 essentially repeats the process to confirm the authenticity of the control signal. The second SDN Controller 102 receives a control signal 122 through controller-plane layer 12 having a time stamp 124 and control message data 126 ("ARP message"), generates hash values for each 128, 130 and combines them to form a combined hash value 132 (received "combined hash") unique to the control message that was received. The received message 122 is then authenticated by comparing received "combined hash" 132 to the original "combined hash" 116 saved in the blockchain database # in blockchain based security and autonomy layer 14 (step 140). In some embodiments, the received "combined hash" may be saved in a buffer 142 for later comparison with the original "combined hash" 116 in the blockchain database (step 140) to allow seamless end-to-end host traffic transfer (step 144).

Detection Mechanism for Malicious Hosts

To prevent malicious hosts from abusing the cloud platform, the present invention provides a mechanism that detects and identifies the malicious hosts by identifying the authorization of the individual hosts using a MAC-IP association. The MAC address is a unique feature for a given host, such that the feature can be encapsulated in to a data frame. Host IP is also a feature which is unique to a host in a certain domain. Therefore, MAC-IP association may be used to uniquely identify a host in a certain management domain. As will be apparent, a "host" is any end-device which connects to an SDN switch. In various embodiments, the detection mechanism for malicious hosts of the present invention will comprise the integrity verification mechanism described above.

In these embodiments, every valid host acquires an IP address using Dynamic Host Configuration Protocol (DHCP) at the associated SDN controllers. In these embodiments, the Cloud Service Provider (CSP) has a knowledge of all the available MAC addresses in its management domain. Therefore, the CSP is able to bind an IP address to available MAC addresses and record the IP-MAC association in the blockchain-based security and autonomy layer 14, which ensures the immutable exchange of such information within controllers. A typical IP-MAC association table is illustrated in Table I, below.

A MAC address is a unique feature for a given host, such that the feature can be encapsulated into a data frame. Host IP is also a feature which is unique to a host in a certain domain. Therefore, MAC-IP association is the perfect association to uniquely identify a host in a certain management domain.

TABLE I

Example of an IP-MAC association table.

| Host IP | MAC Address |
| --- | --- |
| 20.0.0.1 | 48-2C-6A-1E-59-3D |
| 20.0.0.2 | 48-2C-6A-1E-58-AC |
| 20.0.0.5 | 48-2C-6A-1E-A1-5D |

Figure 6:
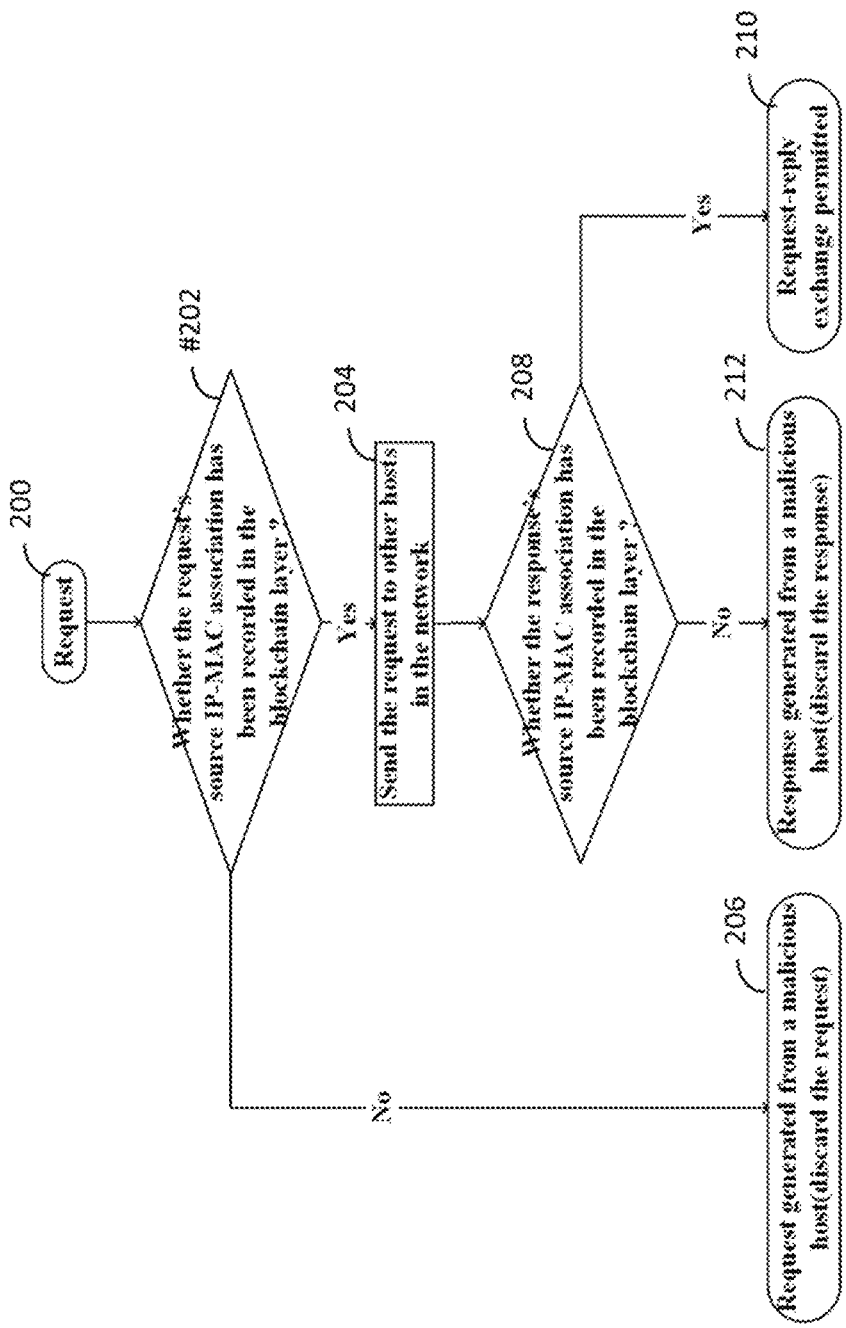
FIG. 6 is a flow chart outlining a detection mechanism for malicious hosts according to one or more embodiments of the present invention.

This process is further illustrated in FIG. 6. In step 200, a host requests an IP via DHCP. The SDN controller then checks whether the host MAC address is available in the blockchain-based layer (step 202). If it is, the controller concludes that the authorization of the host has been verified and releases the corresponding IP address to the host (step 204). If not, it is concluded that the request was received from a malicious host and the request is discarded (step 206). In step 108, the SDN controller checks to see if the source IP MAC association has been recorded in the blockchain-based security and autonomy layer 14. If so, a request-reply exchange with the requesting host is permitted (step 210). If not, it is concluded that the request was received from a malicious host and the request is discarded (step 212).

Further, in one or more of these embodiments, the SDN controller will also check the integrity of associated Address Resolution Protocol (ARP) messages at the connection establishment phase. As will be understood by those of skill in the art, the Address Resolution Protocol (ARP) is a communication protocol used for discovering the link layer address, such as a MAC address, associated with a given internee layer address, typically an IPv4 address. This mapping is critical to the function in the Internet protocol suite. ARP was defined in 1982 by RFC 826, which is Internet Standard STD 37. By doing so, the networking solution ensures that two hosts cannot establish an end-to-end IP association without a qualifying ARP request-reply pair. (See, FIG. 6). The detection mechanism for malicious hosts of the present invention is a significant improvement in this technology.

Autonomous Bandwidth Provisioning Mechanism

Figure 7:
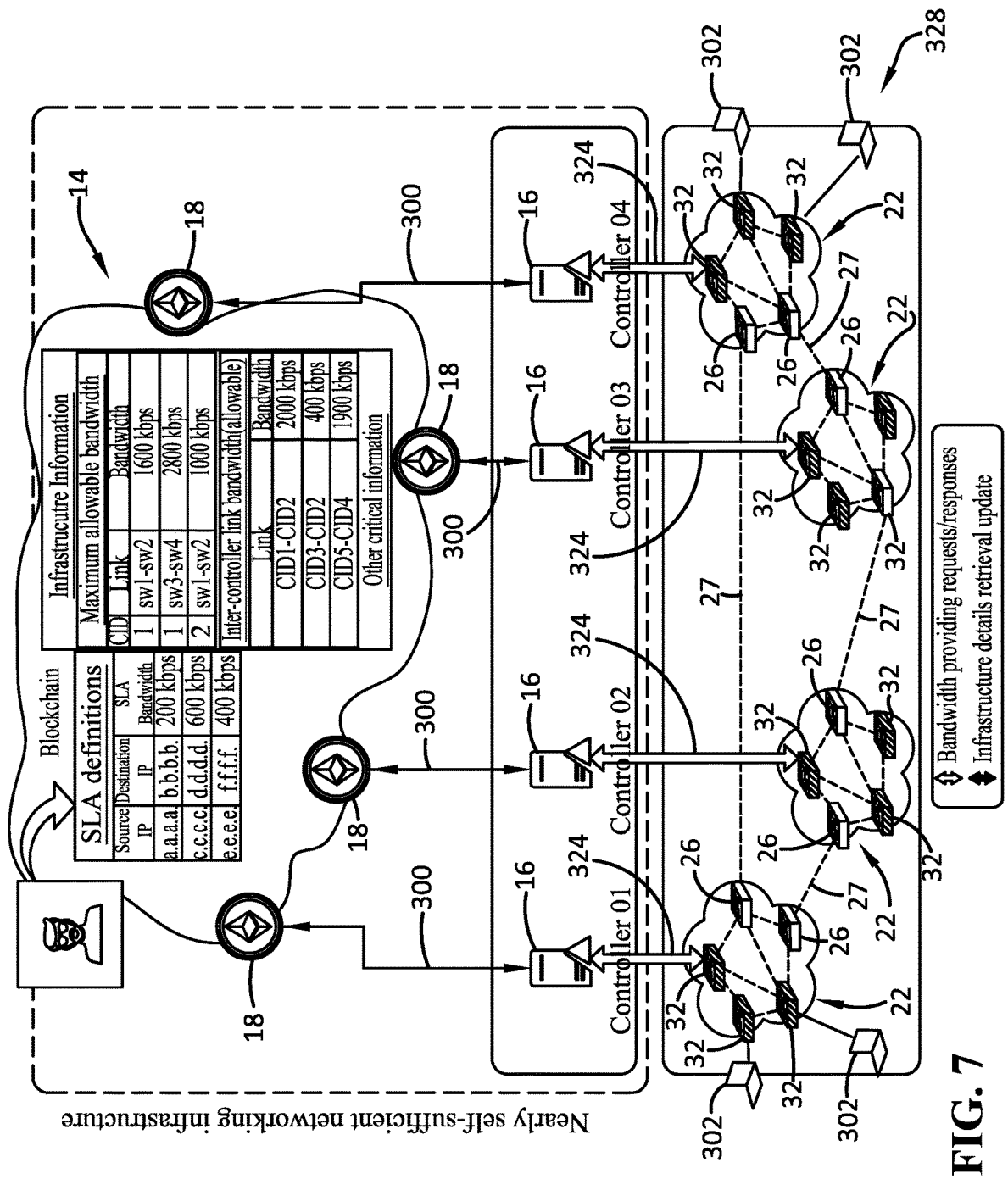
FIG. 7 is a schematic diagram outlining a detection mechanism for malicious hosts according to one or more embodiments of the present invention.

In various embodiments, the present invention further provides an autonomous bandwidth provisioning mechanism to enhance the availability of the cloud platform. As illustrated in FIG. 7, in these embodiments, the immutability and scripting functionality of the blockchain are exploited to impose Service Level Agreements (SLAs) into the networking logic. As will be understood by those of skill in the art, Service Level Agreements (SLAs) are agreements between parties on a network the define the level of service expected by each party and laying out the metrics by which that service is measured, and in some cases the remedies or penalties, if any, should the agreed-on service levels not be achieved. Additionally, the scripting functionality of the blockchain and the metering and queue functionality of the OpenFlow Switch Specification are employed to realize the real-time awareness of the available bandwidths of each links. In various embodiments, the autonomous bandwidth provisioning mechanism of the present invention will comprise the integrity verification mechanism described above.

As shown in FIG. 7, SLA definitions and infrastructure information are saved in the blockchain-based security and autonomy layer 14. Infrastructure details are retrieved and updated between the SDN controllers 16 in the multi-controller SDN networking layer 12 and the blockchain-based autonomous security mechanisms 18 of the blockchain-based security and autonomy layer 14 via communications lines 300. Bandwidth provisioning requests and responses are exchanged between the SDN controllers 16 in the multi-controller SDN networking layer 12 and domains 22 the P2P data-plane layer 328 via communication lines 324. In these embodiments, the P2P data-plane layer 328 can be thought of as representing the cloud and the domains 22 are accessible by users 302, as shown.

In these embodiments, it is assumed that the malicious traffic flows are identified and discarded via integrity verification mechanism and the detection mechanism for malicious hosts, described above. For these embodiments, normal traffic flows can be classified into two categories: guaranteed traffic flows and best-effort traffic flows. This classification is automatically realized according to the flag segment in a SLA definition table. An example of SLA definition table is illustrated in Table II, below.

TABLE II

Example of an SLA definition table.

| Source IP | Destination IP | SLA Bandwidth | Flag |
| --- | --- | --- | --- |
| a.a.a.a | b.b.b.b | 1 Mbps | 1 |
| c.c.c.c | d.d.d.d | 2 Mbps | 1 |
| e.e.e.e | f.f.f.f | 0 Mbps | 0 |

In this table, the first two rows correspond to guaranteed traffic (1 Mbps and 2 Mbps) that is identified by Flag 1, and the third row corresponds to best-effort traffic that is identified by Flag 0. When a provisioning request comes from a host in these embodiments, the Cloud Service Provider (CSP) imposes the associated SLA definition table automatically via blockchain smart contract in the blockchain-based security and autonomy management layer 14. In one or more embodiments, all the entries of the SLA definition table are recorded as structs and a mapping datatype is used to store all the entries in the blockchain-based layer with each data entry (of a type struct) mapped with an index (of type unit 256 (i.e., a 256 bit unsigned integer)). The definition of the SLA table depends on the task and networking environment, such as Quality of Service (QoS) metrics of the task and the type and number of data flows in the networking environment. The entries of the SLA definition table are also updated in real-time via the blockchain smart contract and in order to reflect the changes in underlying networking state.

Figure 8:
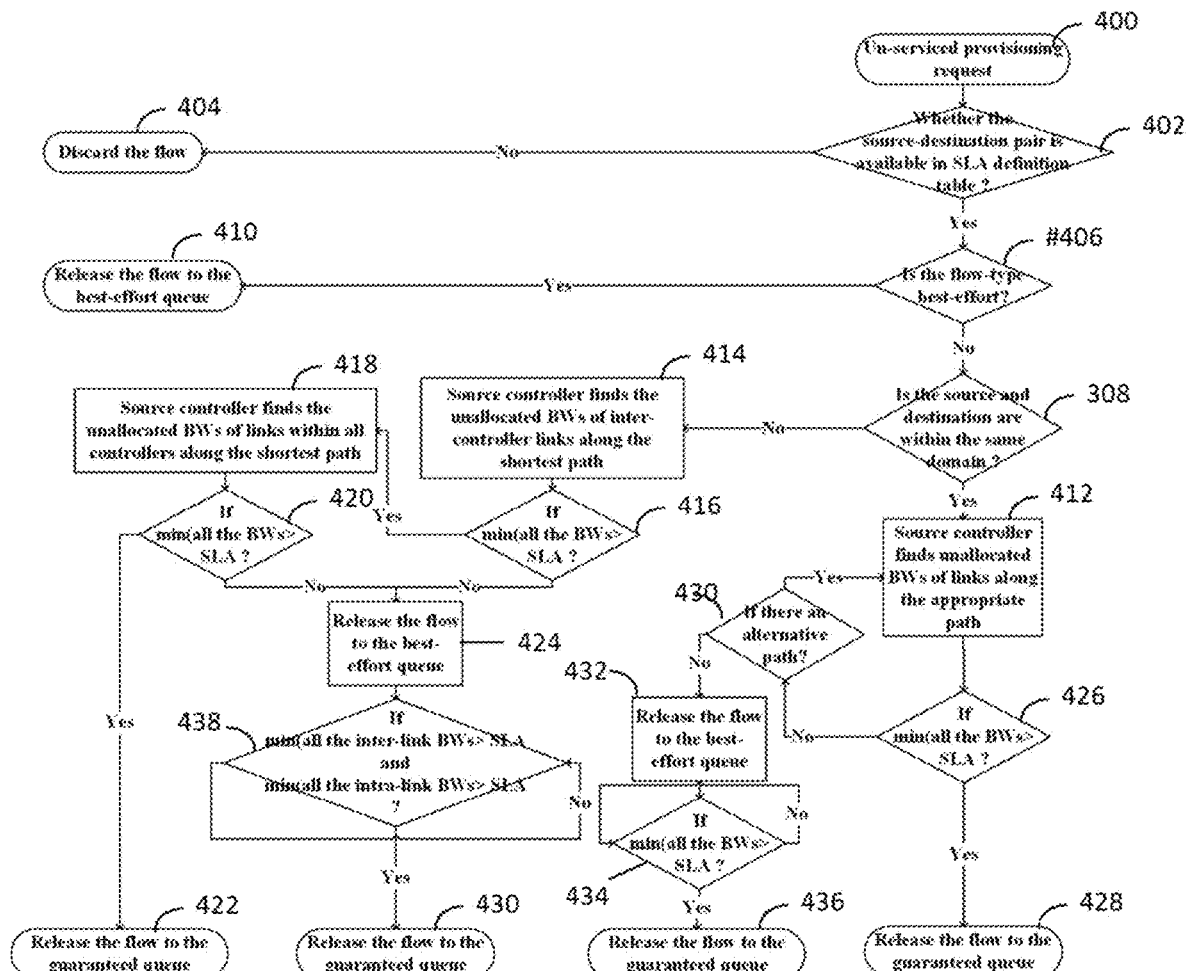
FIG. 8 is a flow chart outlining a mechanism of our autonomous bandwidth provisioning method according to one or more embodiments of the present invention.

Then the host sends provisioning request to establish the end-to-end connection and the SDN controllers deploy the requested flow according to the mechanism diagram in FIG. 8. If the request from the host is a guaranteed service request, the associated source SDN controller checks whether there is enough bandwidth available from source to destination for the guaranteed flow. If it is a best-effort service request, the SDN controller routes the traffic along the shortest path from source to destination. To achieve this automatically, one critical data-structure, traversal edge-switch matrix, is defined via the blockchain smart contract to the corresponding edge-switch when traversing from one controller to another. This matrix is used to identify the two domain-edge switches of the domain of each controller that participates in the packet switching process for a certain source and destination, which is fed to individual controller to achieve the shortest path locally.

To automatically identify whether there is sufficient bandwidth available for the guaranteed traffic, two critical data-structures are defined in the blockchain-based security and autonomy management layer 14 via the blockchain smart contract: (1) Inter-controller link bandwidth matrix that records all the links connecting the SDN controllers and their available bandwidths, and (2) Intra-controller link bandwidth matrix that records the bandwidths of all the available links within the domain of individual controllers. In these embodiments, these two matrices are used to track all the available bandwidths throughout the network and make decision on the bandwidth provisioning for a given pair of source and destination hosts. If there is sufficient bandwidth available, the provisioning request can be fulfilled successfully and the availability of the bandwidth is updated in the blockchain-based layer accordingly. If there is no sufficient bandwidth available, the requested data flow is deployed along the best-effort path and automatically switched to the guaranteed path when the bandwidth becomes sufficient. During this procedure, new provisioning requests are blocked to ensure that link bandwidths have been updated accurately before new provisioning decisions can be made.

In one or more embodiments, the autonomous bandwidth allocation mechanism is as shown in FIG. 8. As can be seen, an un-serviced provisioning request is generated by an end host at step 400. In step 402, the source SDN controller (i.e., the controller that serves the source host) identifies the source-destination pair for the provisioning request and checks to see if that source-destination pair is available in the SLA definitions table stored in the blockchain-based security and autonomy management layer 14. As will be apparent, the SLA definitions table records the IP addresses of the source and the destination for a source destination pair, as well as the required band width (BW). If it is not, the provisioning request is discarded (step 404). If it is, the process moves to step 406, where the source SDN controller checks to see if the flow type of the request is "best effort" If it is, the request is released to the best-effort queue (step 410) but if not, the request moves to step 408, where the source controller determines whether the source and destination of the request are within the same domain (as defined above) based upon network maps stored in the blockchain smart contract.

If the source and destination of the request are within the same domain, the process moves to step 412, where the source controller will determine an appropriate path from the source to the destination based upon intra-controller link bandwidth matrix that records the bandwidths of all the available links within the domain of the individual SDN controllers, and is stored in a blockchain database of the blockchain-based security and autonomy management layer 14. The source controller then calculates the minimum of available bandwidths for each link along the appropriate path from the source IP to the destination IP. In step 426, this minimum is then compared to the source-destination pair BW stored in the SLA definitions table. If the minimum of available bandwidths is greater than source-destination pair BW, the flow is released to the guaranteed queue (step 428). If not, the process moves to step 430 where the source controller will check to see if there is an alternative path. If so, the request is sent back to step 412, but if not the request moves to step 432, where it is released into the best-effort queue. In step 434, the request (now in the best-effort queue) is checked to see if the minimum total BW for the appropriate path is greater than the source-destination pair BW stored in the SLA definitions table. If it is, the request is released into the guaranteed queue (step 436). Step 434 is repeated until the request is either delivered from the best effort queue or the minimum total unallocated BW for the appropriate path is greater than the source-destination pair BW stored in the SLA definitions table and the request is released into the guaranteed queue (step 436).

If the source and destination of the request are not within the same domain (step 408), the process moves to step 414, where the source controller will determine the shortest path from the source to the destination based upon based upon the intra-controller link bandwidth matrix that records all the links connecting the SDN controllers and their available bandwidths, stored in a blockchain database of the blockchain-based security and autonomy management layer 14. The source controller then adds up the minimum available bandwidth for each link along this shortest path from the source IP address to the destination domain.

At step 416, the source SDN controller compares the minimum available bandwidth for each link along the shortest path from the source IP to the destination domain to a corresponding value in the SLA definitions table. If so, the request moves to step 418 and if not, the request is released into the best efforts queue (step 424). At step 418, the source SDN controller determines the minimum unallocated bandwidth for all links along the shortest path from the source IP address to the destination IP address, based upon the inter-controller link bandwidth matrix (records all the links connecting the SDN controllers and their available bandwidths) and the intra-controller link bandwidth matrix (records the bandwidths of all the available links within the domain of individual controller). In step 420, the source controller compares this value to the source-destination pair BW stored in the SLA definitions table. If it is, the request is released to the guaranteed queue (step 422), but if not, it moves to step 424, where it is released to the best efforts queue. Despite having been released to the best efforts queue, Step 420 is repeated until the request is either delivered from the best effort queue or the minimum total unallocated BW for the appropriate path is greater than the source-destination pair BW stored in the SLA definitions table and the request is released into the guaranteed queue (step 440).

Figure 9:
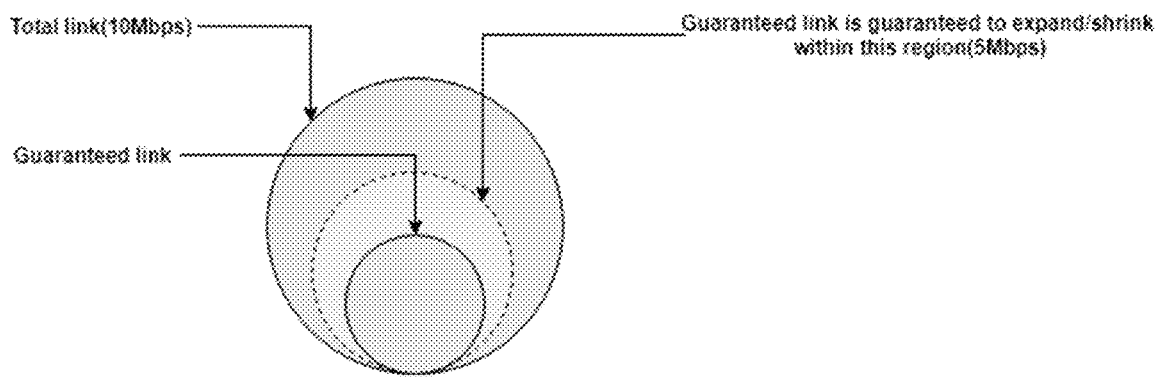
FIG. 9 is a schematic illustration of bandwidth allocation inside a link for guaranteed traffic according to one or more embodiments of the present invention.

In some of embodiments, each physical or a virtual interface of a SDN switch (port) contains a queue to service the guaranteed traffic. In these embodiments, no queue defined for the best-effort traffic. FIG. 9 represents the bandwidth allocation inside a certain link. As shown in FIG. 9, the guaranteed traffic has a predefined maximum guaranteed bandwidth. Additionally, due to its nature of expansion and shrinking based on the throughput, the networking resources can be utilized efficiently without any resource exhaustion.

The autonomous bandwidth provisioning mechanism of the present invention is a significant improvement in this technology.

Simulations

To evaluate the performance of and further reduce to practice the proposed blockchain-powered SDN-enabled networking infrastructure of the present invention, two case studies were conducted. Case A evaluated the performance of the verification mechanism in the networking infrastructure, which is designed to verify the integrity of the critical control and management commands for the cloud platform. In Case B evaluated the performance of the proposed autonomous bandwidth provisioning mechanism of the present invention. For the simulations, a multi-controller SDN networking layer with the southbound protocol OpenFlow 1.3 was used. (See, Open Networking Foundation, "OpenFlow Switch Specification," Jun. 25, 2012, the disclosure of which in incorporated herein in its entirety). In addition, for simulation purposes, Mininet version 2.3.0d6, a rapid prototyping framework for SDN, was used with Ryu Controller. Mininet version 2.3.0d6 is publicly available from https://github.com/mininet/mininet and the Ryu controller is publicly available at https://osrg.github.io/ryu/. Additionally, Ofsoftswitch13 (publicly available at http://cpqd.github.io/ofsoftswitch13/) was used as the OpenFlow switch for simulation.

Case Study A

Figure 10:
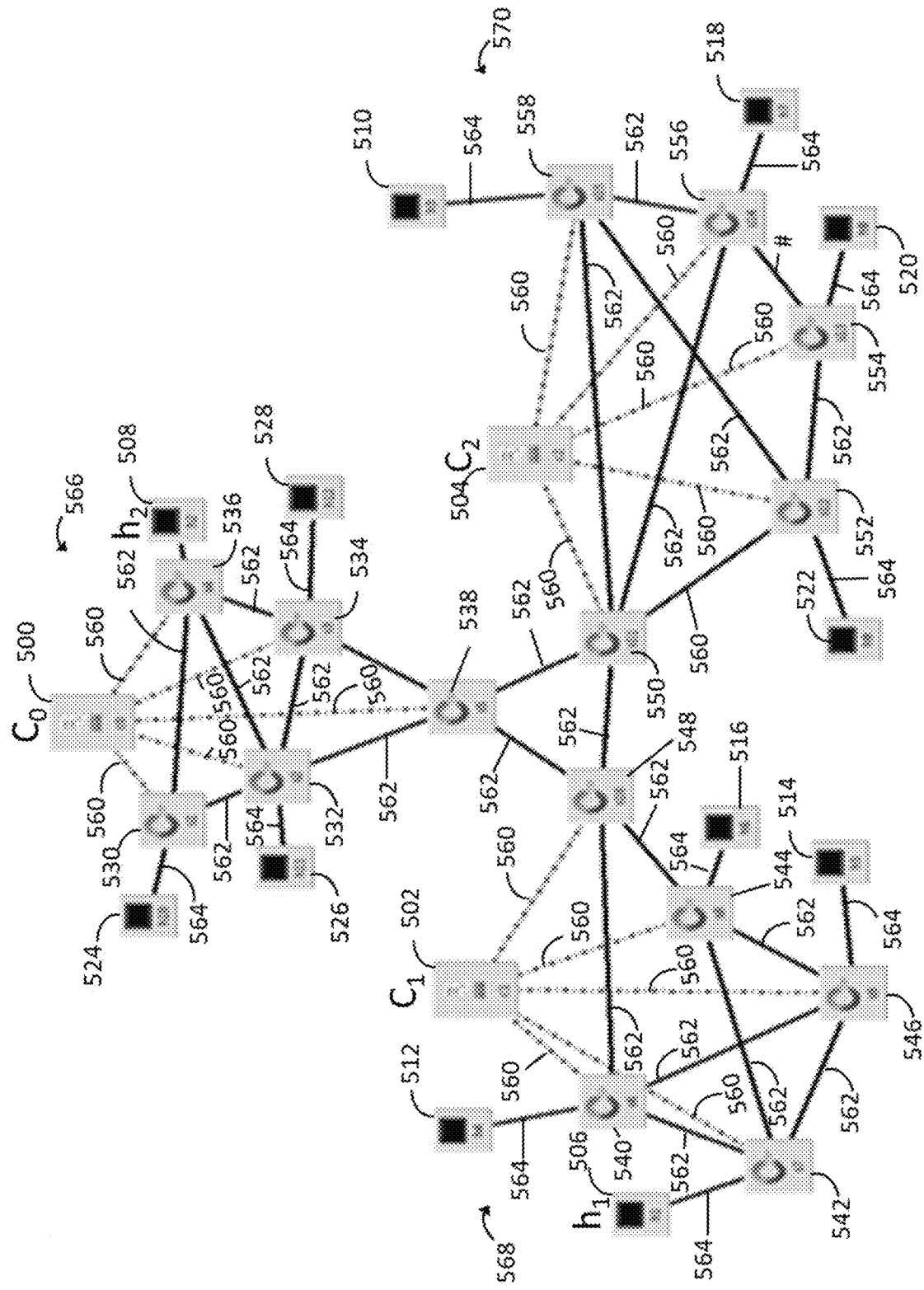
FIG. 10 is an illustration of the topology of the multi-controller SDN-based networking layer used in test Case A.

The network used for the case study is shown in FIG. 10. The network has a multi-SDN networking layer comprising three controllers, $C_0$ 500, $C_1$ 502, and $C_2$ 504, and further comprised twelve hosts, $h_1$ 506, $h_2$ 508, $h_3$ 510, $h_4$ 512, $h_5$ 514, $h_6$ 516, $h_7$ 518, $h_8$ 520, $h_9$ 522, $h_{10}$ 524, $h_{11}$ 526, and $h_{12}$ 528, and fifteen switches of which three were domain-edge switches $S_5$ 538, $S_{10}$ 548 and $S_{11}$ 550, and twelve were domain switches $s_1$ 530, $s_2$ 532, $s_3$ 534, 536, $s_6$ 540, $s_7$ 542, $s_8$ 544, $s_9$ 546, $s_{12}$ 552, $s_{13}$ 554, $s_{14}$ 556, $s_{15}$ 558, as shown in FIG. 10. As can also be seen in FIG. 10, the controllers were connected to the switches via controller-switch communication lines 560, the switches were all connected to each other via switch-switch communication lines 562, and the hosts were connected to the switches via host-switch communication lines 564.

The three SDN domains associated with these individual controllers 566, 568, 570 were connected to each other via domain-edge switches $S_5$ 538, $S_{10}$ 548 and $S_{11}$ 550 that were used for inter-domain traffic. A host ($h_1$ 506) associated with $C_1$ 502 was designated to establish communication with a second host ($h_2$ 508) associated with $C_0$ 500. For purposes of the simulation, it was assumed that $h_1$ and $h_2$ did not have knowledge of each other's MAC address. Initially, $h_1$ flooded a control command, in this case an ARP request, requesting the MAC address of $h_2$ throughout all the controller domains. The ARP request was propagated to $C_0$ 500 and $C_2$ 504. The communication between the hosts associated with $C_0$ and $C_1$ was established after $h_2$ responded to the ARP request successfully. The screenshot of the terminals associated with the three SDN controllers are shown in FIGS. 11A-E, which present the partial operations in the blockchain-based security and autonomy layer.

Figure 11A:
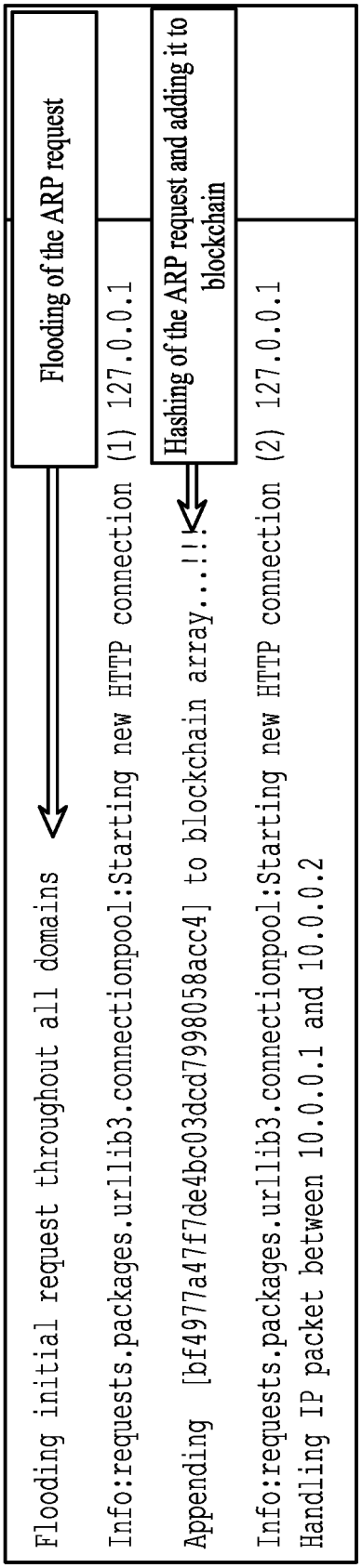
FIGS. 11A-E are screenshots of the terminals for the three controllers.
Figure 11B:
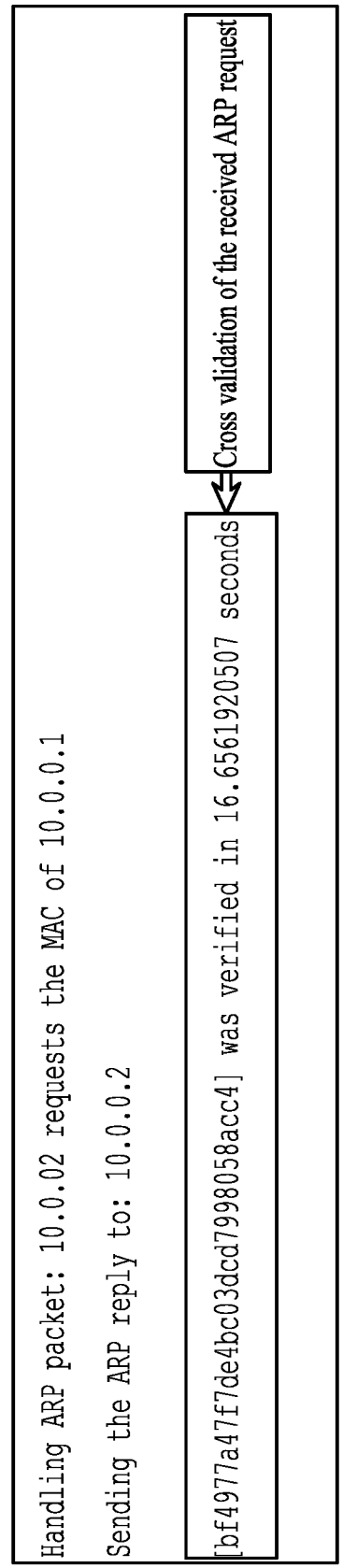
Figure 11C:
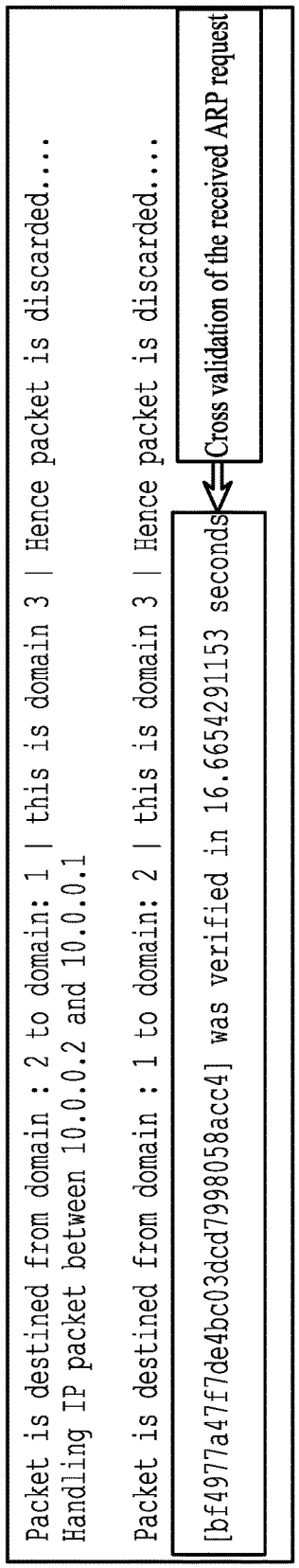
Figure 11D:
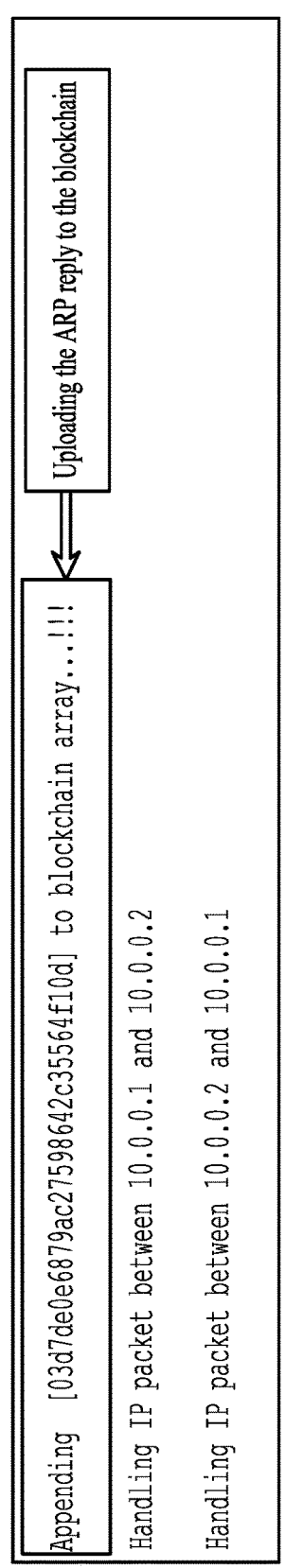
Figure 11E:
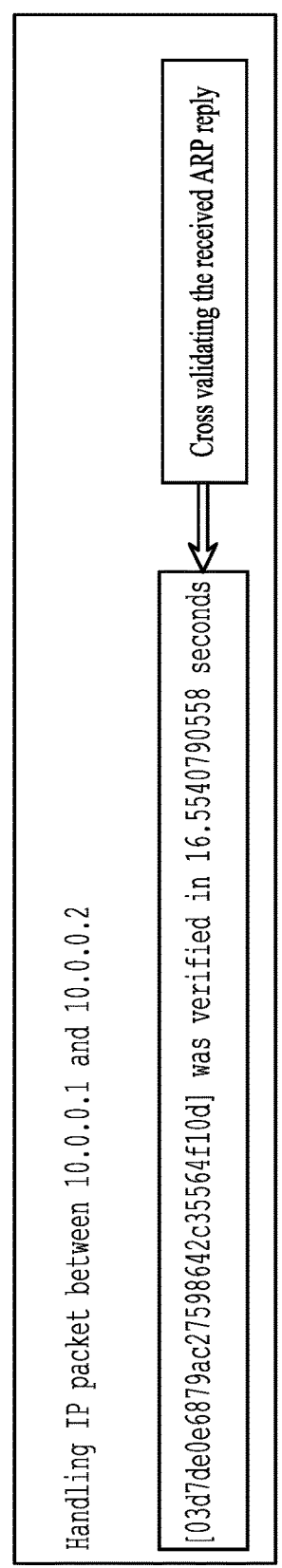

As shown in FIG. 11A, when $C_1$ sent the ARP request of $h_1$ to other controllers, it also hashed the content and timestamp of the ARP request and recorded the combined hash value in the blockchain-based security and autonomy layer by uploading it as a state variable in the blockchain smart contract. From FIGS. 11B-C, it can be seen that after receiving the ARP request, both controllers $C_0$ and $C_2$ validate the integrity of the received command against the blockchain smart contract. After the cross-validation was completed successfully, the controller $C_0$ replied to the request as shown in FIGS. 11D-E. The integrity of the response from $C_0$ is also verified at $C_1$ using the same validation mechanism.

Case Study B

Figure 12:
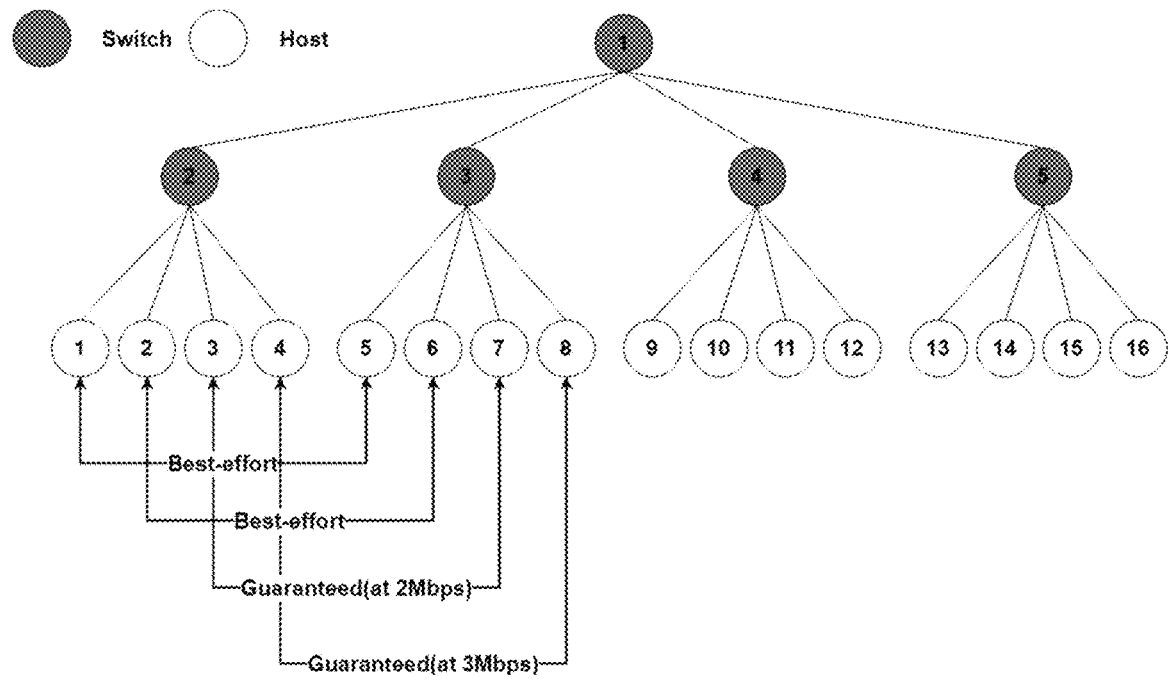
FIG. 12 is an illustration of the topology of the networking layer used in test Case B.

In this case study, the networking layer was given a depth=2 and fan-out=4, as shown in FIG. 12. A maximum link bandwidth of 9.4 Mbps was assumed. The queue functionality of the OpenFlo Switch Specification in the networking layer was applied to achieve the guaranteed bandwidth of 5 Mbps for each port, which enabled logically defining a tunnel for the guaranteed traffic. As will be understood, a "port" is a physical or a virtual interface of a SDN switch. The four different service-request traffics considered in this simulation are detailed in Table III, below.

TABLE III

Details of the service-request traffics.

| Flow | SLA Bandwidth | Traffic Type | Identification |
|---|---|---|---|
| Between Host 1 and Host 5 | 5.7 Mbps | Best-effort (BE) service request | BE 1 |
| Between Host 2 and Host 6 | 3.7 Mbps | BE service request | BE 2 |
| Between Host 3 and Host 7 | 1.8 Mbps | Guaranteed service request | Guaranteed 1 |
| Between Host 4 and Host 8 | 2.8 Mbps | Guaranteed service request | Guaranteed 2 |

As shown in Table III, the traffics "BE 1" and "BE 2" are the best-effort service-request traffics and the traffics "Guaranteed 1" and "Guaranteed 2" are the guaranteed service-request traffics. These four traffics were selected for the analysis in such a way that all of them were routed via the same shortest path. During the simulation, there only existed the traffics BE 1 and BE 2 from time t=0 s to 203 s. The traffics Guaranteed 1 and Guaranteed 2 appear beginning from time step t=203 s. The bandwidth occupancy is shown in FIGS. 13-14.

Figure 13:
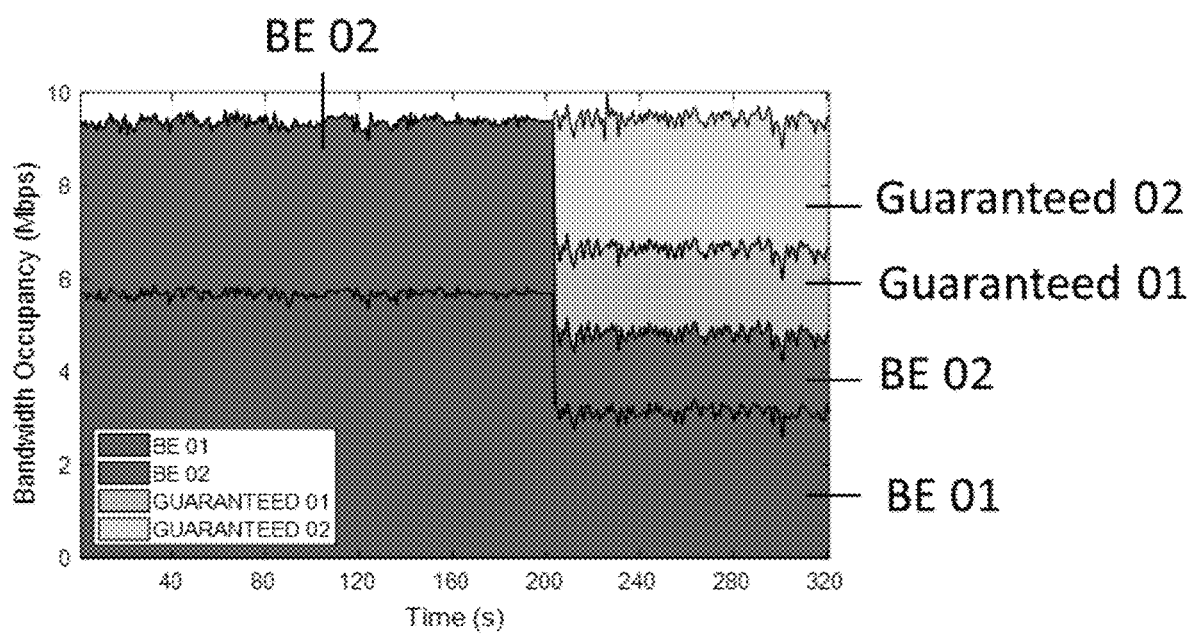
FIG. 13 is a cumulative bandwidth plot showing the accumulative bandwidth occupancies for the service-request traffics in test Case B.
Figure 14:
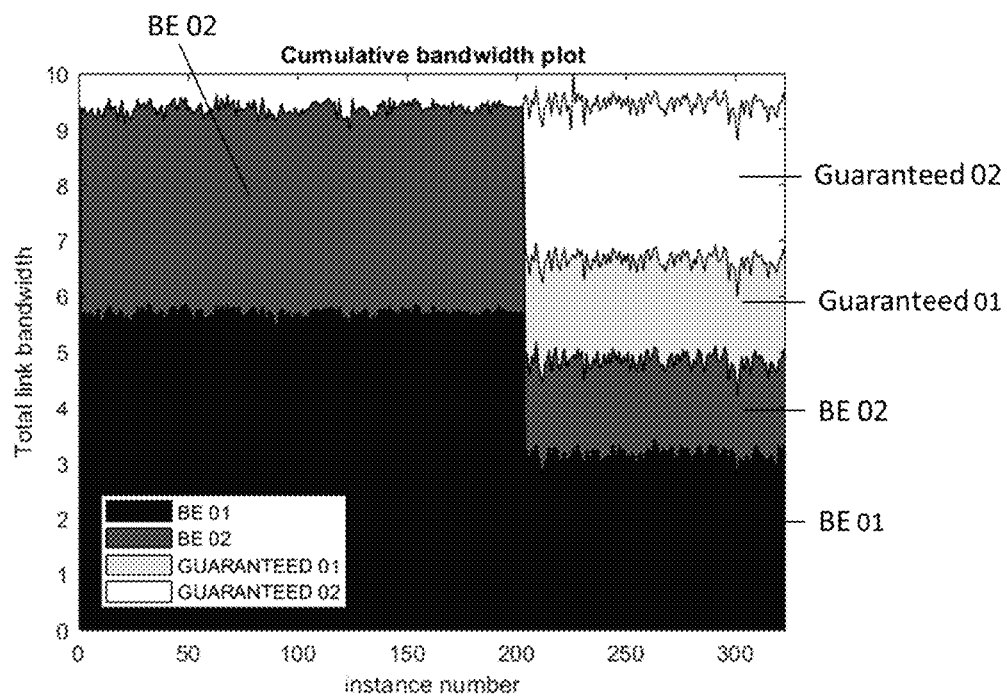
FIG. 14 is a cumulative bandwidth plot showing the accumulative bandwidth occupancies for the service-request traffics in test Case B.

As shown in FIG. 13, the best-effort service-request traffics BE 1 and BE 2 occupied the entire available link bandwidth until t=203 s. The guaranteed service-request traffics appear at t=203 s, whose guaranteed bandwidths are 1.8 Mbps and 2.8 Mbps, respectively. These two guaranteed traffics used almost all the guaranteed bandwidth that is 5 Mbps. The immutability and the scripting functionality of the blockchain technology in our blockchain-based layer were exploited to securely and automatically impose the SLAs to the network logic. For example, in this case study the blockchain-based layer ensured that the total bandwidth of the flows in the guaranteed queue should be less or equal to the guaranteed queue maximum bandwidth. The metering functionality of the OpenFlow Switch Specification in the networking layer was exploited to bandlimit the traffics Guaranteed 1 and Guaranteed 2 to 2 Mbps and 3 Mbps inside the guaranteed queue, respectively, which was implemented to prevent any potential resource exhaustion.

Figure 15:
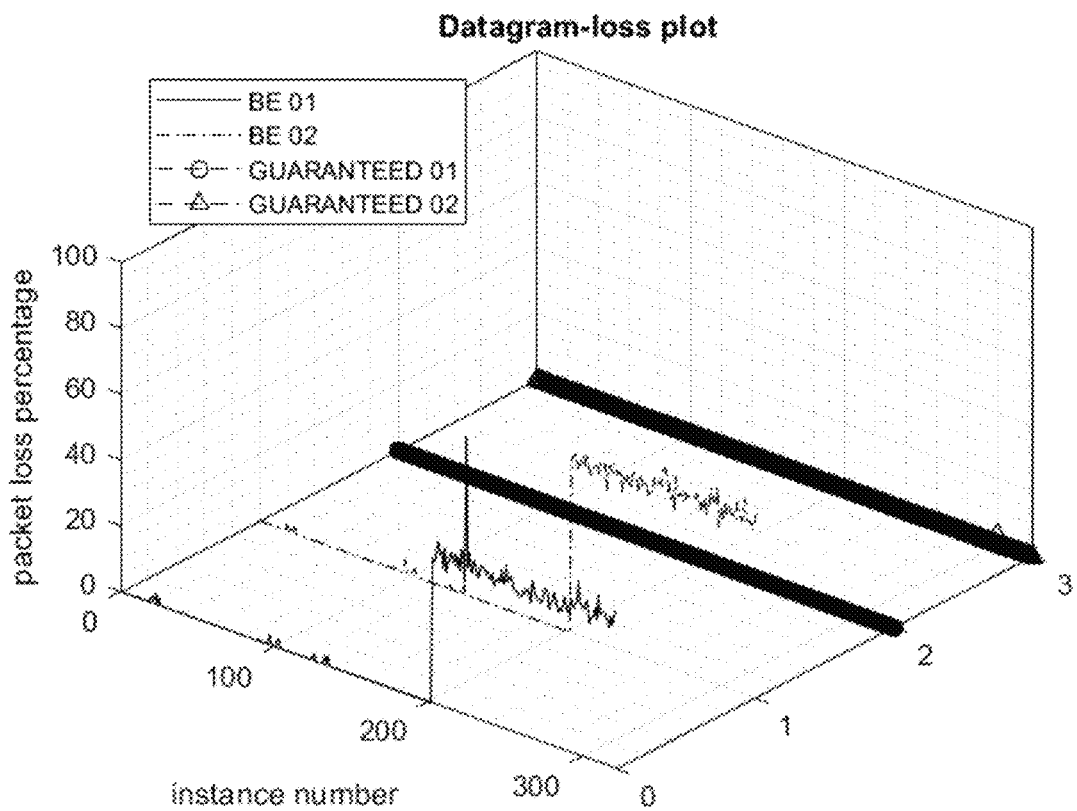
FIG. 15 is a graph showing the packet-loss rates for the individual service-request traffics in test Case B.

The packet-loss rates for the individual traffics are shown in FIG. 15. From FIG. 15, we can observe during the time window [1 s, 203 s], the packet-loss rates for the traffics BE 1 and BE 2 were neglectable. This is reasonable because that their requested bandwidths were 5.7 Mbps and 3.7 Mbps, respectively. The total requested bandwidth, 9.4 Mbps, is approximately equal to the total available link bandwidth, and thus these two traffics did not interfere each other. Additionally, a significant packet-loss rate for BE 1 and BE 2 was observed beginning from time t=203 s. It is believed that this was because the two guaranteed traffics, Guaranteed 1 and Guaranteed 2, which appear beginning from t=204 s, take up to 4.6-Mbps of bandwidth. Because of this, the bandwidth available for the two best-effort traffics was reduced from 9.4 Mbps to 5 Mbps. Furthermore, the packet-loss rates of the two guaranteed traffics are very low throughout the simulation, which illustrated the effectiveness of the metering and queue functionalities of the OpenFlow Switch Specification in the networking layer and the immutability and scripting functionality provided by the blockchain-based security and autonomy layer.

Overall, these simulation results illustrate the effectiveness of the blockchain-powered cloud management system of the present invention for cloud management.

All publications, patent applications, patents, and other references mentioned herein are expressly incorporated by reference in their entirety, which means that they should be read and considered by the reader as part of this text. That the document, reference, patent application, or patent cited in this text is not repeated in this text is merely for reasons of conciseness. In the case of conflict, the present disclosure, including definitions, will control. All technical and scientific terms used herein have the same meaning.

Further, any compositions or methods provided herein can be combined with one or more of any of the other compositions and methods provided herein. The fact that given features, elements or components are cited in different dependent claims does not exclude that a least some of these features, elements or components maybe used in combination together.

In light of the foregoing, it should be appreciated that the present invention significantly advances the art by providing a blockchain-powered cloud management system that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A blockchain-powered cloud management system comprising:
   a multi-controller software-defined networking (SDN) layer having two or more networked SDN controllers;
   a cloud management layer for managing network traffic within a cloud or between two or more clouds; wherein said cloud management layer comprises one or more of data domains containing one or more virtual machines, wherein said virtual machines are connected to at least one of said two or more networked SDN controller through a domain switch and wherein said one or more of data domains are networked together through one or more domain edge switches and one or more inter-domain connections to form a data plane back-bone network for inter-domain communication; and
   a blockchain-based security and management layer, wherein said blockchain-based security and management layer comprises: a decentralized blockchain database connected to each of said two or more networked SDN controllers; and one or more digital smart contracts.

2. The blockchain-powered cloud management system of claim 1 wherein one or more of said data domains are a data center comprising a domain edge switch and one or more physical servers, wherein each physical server contains at least one domain switch with one or more virtual machines operatively connected thereto, and wherein said at least one domain switch is connected to at least one of said two or more networked SDN controllers.

3. The blockchain-powered cloud management system of claim 1 wherein said two or more data domains are connected in a peer-to-peer fashion.

4. The blockchain-powered cloud management system of claim 1 wherein said two or more networked SDN controllers are connected in a peer-to-peer fashion.

5. The blockchain-powered cloud management system of claim 1 wherein said domain edge switches are connected to each other in a peer-to-peer fashion.

6. The blockchain-powered cloud management system of claim 1 wherein a virtual SDN switch and domain edge switches in a data center location are connected to each other in a peer-to-peer fashion.

7. The blockchain-powered cloud management system of claim 1 wherein said blockchain-based security and management layer further comprises blockchain middleware installed on each of said two or more networked SDN controllers.

8. The blockchain-powered cloud management system of claim 1 wherein said domain switches and said domain edge switches are OpenFlow-enabled switches or switches supported by a southbound communication protocol.

9. The blockchain-powered cloud management system of claim 1 wherein each of said virtual machines is assigned a unique IP address.

10. The blockchain-powered cloud management system of claim 1 wherein any one of said two or more networked SDN controllers is configured to send at least one of control commands and management commands to any one or more of said SDN controllers in said cloud management layer.

11. The blockchain-powered cloud management system of claim 1 wherein said domain edge switches are connected to each other by Generic Routing Encapsulation (GRE) tunnels.

12. The blockchain-powered cloud management system of claim 10 wherein said at least one of control commands and management commands comprises message data and a time stamp.

13. The blockchain-powered cloud management system of claim 1 wherein the virtual SDN switch and domain edge switches in a data center location are connected to each other by Generic Routing Encapsulation (GRE) tunnels.

14. The blockchain-powered cloud management system of claim 1 wherein one or more of said virtual machines in said multi-controller software-defined networking (SDN) layer is identified as a valid host, wherein each valid host has a unique Media Access Control (MAC) address and each unique MAC address has a unique Internet Protocol (IP) address, and the association of said IP address and MAC address for each valid host is recorded in said blockchain-based security and management layer.

15. The blockchain-powered cloud management system of claim 1 wherein said blockchain-powered cloud management system has a guaranteed flow and a best effort flow.

16. A method for verifying the integrity of control or management commands in a cloud platform using the blockchain-powered cloud management system of claim 1, the method comprising:
   A) receiving or generating a control or management command in one of said two or more networked SDN controllers, wherein said control or management command comprises message data and a time stamp;
   B) generating a first hash value for said message data and a second hash value for said time stamp, which are then combined to form a sent message hash value for said control or management command;
   C) recording said sent message hash value in a blockchain database in said blockchain-powered cloud management system;
   D) sending the control or management command to a second networked SDN controller designated and configured to receive said control or management command;
   E) identifying a received message data and a received time stamp in the control or management command received by the second networked SDN controller and generating a third hash value for the received message data and a fourth hash value for the received time stamp, which are then combined to form a received message hash value for said received control or management command; and F) comparing the received message hash value to the sent message hash value saved in said blockchain database to verify the integrity of control and management command received by said second networked SDN controller.

17. The method of claim 16 wherein the step of recording said sent message hash value in said blockchain database (step C) comprises recording said sent message hash value as a state value in a smart contract in said blockchain-based security and management layer and the step of comparing (step F) comprises comparing the received message hash value to the sent message hash value stored as a state value in the smart contract on said blockchain-based security and management layer.

18. A method for detection malicious hosts in a cloud platform using the blockchain-powered cloud management system of claim 1, the method comprising:
   a. identifying one or more of said two or more networked virtual machines in said multi-controller software-defined networking (SDN) layer as a valid host, wherein each valid host has a unique Media Access Control (MAC) address;
   b. assigning a unique Internet Protocol (IP) address to each MAC address, so that each MAC address has a corresponding IP address;
   c. recording the association of said IP address and MAC address for each valid host to blockchain-based security and management layer;
   d. receiving a request from a source host;
   e. determining whether said source host has, or purports to have, a unique IP address and a MAC address and if not, discarding the request;
   f. if the source host has, or purports to have, a unique IP address and a MAC address, determining whether the source host unique IP address and a MAC address pair have been saved in the blockchain-based security and management layer and is a valid host, and if so, not discarding the request as coming from a potentially malicious host.

19. A method for autonomous bandwidth allocation in the blockchain-powered cloud management system of claim 1, wherein said blockchain-powered cloud management system of claim 1 has a guaranteed flow and a best effort flow, the method comprising:
   a. saving a Service Level Agreements (SLA) definition table created according to instructions saved in a blockchain smart contract in the blockchain-based security and management layer of the blockchain-powered cloud management system of claim 1, wherein said SLA definition table comprising bandwidths for corresponding SLA source-destination pairs, said SLA source-destination pairs comprising pairs of source IP addresses and destination IP addresses;
   b. defining an inter-controller link bandwidth matrix that records all links connecting the SDN controllers of said multi-controller software-defined networking (SDN) layer and their available bandwidths according to instructions saved in the blockchain smart contract in the blockchain-based security and management layer of the blockchain-powered cloud management system of claim 1, and
   c. defining an intra-controller link bandwidth matrix that records the bandwidths of all the available links within the data domains of each SDN controllers, including links between said data domains of each SDN controllers, according to instructions saved in said blockchain smart contract in the blockchain-based security and management layer of the blockchain-powered cloud management system of claim 1;
   d. producing or generating a provisioning request having a source-destination pair comprising a source IP addresses and destination IP address and designating said for said guaranteed flow;
   e. determining whether the source-destination pair for said provisioning request exists in said SLA definition table, and if not discard said provisioning request;
   f. determining whether the source IP address and destination IP address are in the same data domain or its associated SDN controller;
   g. if the source IP address and destination IP address are in the same data domain or its associated SDN controller, finding the unallocated bandwidth along an appropriate path from the source IP address and destination IP address and determining whether said unallocated bandwidth is greater than the bandwidth for the SLA source-destination pair saved in the blockchain-based security and management layer of the blockchain-powered cloud management system of claim 1;
   h. releasing the allocation request into a guaranteed queue if the unallocated bandwidth for said appropriate path is greater than the bandwidth for the SLA source-destination pair saved in the blockchain-based security and management layer and determining whether there is an alternative path if the unallocated bandwidth is not greater than the bandwidth for the SLA source-destination pair saved in the blockchain-based security and management layer;
   i. repeating step g if there is an alternative path and releasing the allocation request into the best efforts queue and then periodically rechecking to see if unallocated bandwidth for said appropriate path is greater than the bandwidth for the SLA source-destination pair saved in the blockchain-based security and management layer and releasing the allocation request to the guaranteed queue if the unallocated bandwidth for said appropriate path is greater than the bandwidth for the SLA source-destination pair saved in the blockchain-based security and management layer;
   j. if the source IP address and destination IP address are not in the same data domain or its associated SDN controller, finding the unallocated bandwidth along a shortest path from the source IP address and destination IP address and determining whether that unallocated bandwidth for said shortest path is greater than the bandwidth for the SLA source-destination pair saved in the blockchain-based security and management layer of the blockchain-powered cloud management system of claim 1; and
   k. releasing the allocation request into a guaranteed queue if the unallocated bandwidth for said shortest path is greater than the bandwidth for the SLA source-destination pair saved in the blockchain-based security layer and releasing the allocation request into a best effort queue if the unallocated bandwidth for said shortest path is not greater than the bandwidth for the SLA source-destination pair saved in the blockchain-based security layer and then periodically rechecking to see if unallocated bandwidth for said shortest path is greater than the bandwidth for the SLA source-destination pair saved in the blockchain-based security and management layer, and releasing the allocation request to the guaranteed queue if the unallocated bandwidth for said shortest path is greater than the bandwidth for the SLA source-destination pair saved in the blockchain-based security and management layer.

* * * * *